United States Patent
Mcaree et al.

(10) Patent No.: US 8,311,970 B2
(45) Date of Patent: Nov. 13, 2012

(54) PAYLOAD ESTIMATION OF WEIGHT BEARING MACHINERY USING MULTIPLE MODEL ADAPTIVE ESTIMATOR SYSTEM AND METHOD

(75) Inventors: Peter Ross Mcaree, Pinjarra Hills (AU); David Herman Wauge, Scarborough (AU)

(73) Assignee: CMTE Development Limited, Pinjarra Hills, QLD (AU)

( * ) Notice: Subject to any disclaimer, the term of this patent is extended or adjusted under 35 U.S.C. 154(b) by 873 days.

(21) Appl. No.: 12/297,499

(22) PCT Filed: Apr. 19, 2007

(86) PCT No.: PCT/AU2007/000515
§ 371 (c)(1),
(2), (4) Date: Jan. 26, 2009

(87) PCT Pub. No.: WO2007/121517
PCT Pub. Date: Nov. 1, 2007

(65) Prior Publication Data
US 2009/0187527 A1   Jul. 23, 2009

(30) Foreign Application Priority Data
Apr. 20, 2006  (AU) ................................ 2006902069

(51) Int. Cl.
*G06F 9/44*  (2006.01)
(52) U.S. Cl. .......................................... 706/52; 702/174
(58) Field of Classification Search .................... 706/52; 702/174
See application file for complete search history.

(56) References Cited

U.S. PATENT DOCUMENTS

| | | | |
|---|---|---|---|
| 4,775,949 A | 10/1988 | Kalata | |
| 5,499,463 A * | 3/1996 | Profio et al. | 37/398 |
| 6,072,127 A | 6/2000 | Oslakovic | |
| 6,518,519 B1 | 2/2003 | Crane, III et al. | |
| 7,139,651 B2 * | 11/2006 | Knowlton et al. | 701/50 |
| 2004/0193386 A1 | 9/2004 | Flynn et al. | |
| 2006/0074578 A1 | 4/2006 | Lueschow | |

FOREIGN PATENT DOCUMENTS

| | | |
|---|---|---|
| CA | 2288417 | 1/2004 |
| CA | 2457992 | 8/2004 |
| DE | 10138973 A1 | 5/2001 |
| DE | 10138974 A1 | 8/2001 |
| WO | WO02/39073 | 5/2002 |

(Continued)

OTHER PUBLICATIONS

"Multiple Model-Based Control: Development and Initial Evaluation", L. D. Tellman, M. B. Leahy Jr., Decision and Control, 1989, Proceedings of the 28th IEEE Conference on Dec. 13-15, 1989, pp. 2519-2524, vol. 3.*

(Continued)

*Primary Examiner* — Kakali Chaki
*Assistant Examiner* — Mai T Tran
(74) *Attorney, Agent, or Firm* — Barnes & Thornburg LLP

(57) ABSTRACT

A method of payload estimation of weight bearing machinery, the method comprising the steps of: (a) creating a series of Kalman filter approximations to the weight bearing machinery for different levels of payload; (b) determining from the series an approximation to the current operating characteristics of the weight bearing machinery; and, (c) utilizing the parameters derived from the step (b) to determine an estimated payload of the weight bearing machinery.

19 Claims, 10 Drawing Sheets

FOREIGN PATENT DOCUMENTS

WO     WO 02/39073    *   5/2002

OTHER PUBLICATIONS

"Mini-UAV Attitude Estimation Using an Inertially Stabilized Payload", Yaakov Oshman, Michael Isakow, IEEE Transactions on Aerospace and Electronic Systems, vol. 35, No. 4, Oct. 1999, pp. 1191-1203.*

English translation of a Chinese Office Action issued Jul. 7, 2010 for co-pending Chinese Patent Application No. 200780021485.0.

International Search Report based on PCT/AU2007/000515 completed Jun. 20, 2007.

* cited by examiner

Algorithm 1: Multiple model adaptive filter (MMAE)

Initialization:
  States, covariances, and param. probabilities : $\hat{x}_j(t_0^-)$, $P_j(t_0^-)$, $\mu_j(t_0)$
Counters: $i = 0$ (iteration count)
for *duration of swing* do
  for $j = 1$ *to* $r$ do
    wait (timer interrupt)
    read ($z(t_i)$, $u(t_i)$)

*State and covariance update*
    Jacobian: $H_j(t_i) = \left.\dfrac{\partial h\,[x(t)]}{\partial x}\right|_{x(t)=\hat{x}_j(t_i^-)}$ Residual: $r_j(t_i) = z(t_i) - h\,[\hat{x}_j(t_i^-)]$
    Residual covariance: $A_j(t_i) = H_j(t_i)P_j(t_i^-)H_j(t_i)^T + R_j$
    Kalman gain: $K_j(t_i) = P_j(t_i^-)H_j(t_i)^T A_j(t_i)^{-1}$
    State update: $\hat{x}_j(t_i^+) = \hat{x}_j(t_i^-) + K_j(t_i)r_j(t_i)$
    Covariance update: $P_j(t_i^+) = P_j(t_i^-) - K_j(t_i)H_j(t_i)P_j(t_i^-)$
    Model probability density:
    $$f\,[z(t_i)|M_j, Z(t_{i-1})] = |2\pi A_j(t_i)|^{-1/2} \exp\left[-\frac{1}{2}r_j(t_i)^T A_j^{-1} r_j(t_i)\right]$$

*State and covariance prediction*
    Jacobian: $F_j(t_i) = \left.\dfrac{\partial f\,(x(t), u(t), M)}{\partial x}\right|_{\substack{x(t)=\hat{x}_j(t_i^+) \\ u(t)=u(t_i) \\ M=M_j}}$ State prediction: $\hat{x}_j(t_{i+1}^-) = \hat{x}_j(t_i^+) + \int_{t_i}^{t_{i+1}} f\,[\hat{x}_j(t_i^+), u(t_i)]\, dt$
    Transition matrix: $\Phi_j(t_i, t_{i-1}) = \exp(F_j(t_i - t_{i-1})\Delta t)$
    Covariance prediction: $P_j(t_{i+1}^-) = \Phi_j(t_i, t_{i-1})P_j(t_i^+)\Phi_j(t_i, t_{i-1})^T + Q_j$

*Parameter estimation*

Model probability: $\mu_j(t_i) = \dfrac{f(z(t_i)|M_j, Z(t_{i-1}))\mu_j(t_{i-1})}{\sum\limits_{k=1}^{r} f(z(t_i)|M_k, Z(t_{i-1}))\mu_k(t_{i-1})}$ Parameter estimate: $\hat{M}(t_i) = \sum\limits_{j=1}^{r} M_j \mu_j(t_i)$ $i = i + 1$

*FIG. 8*

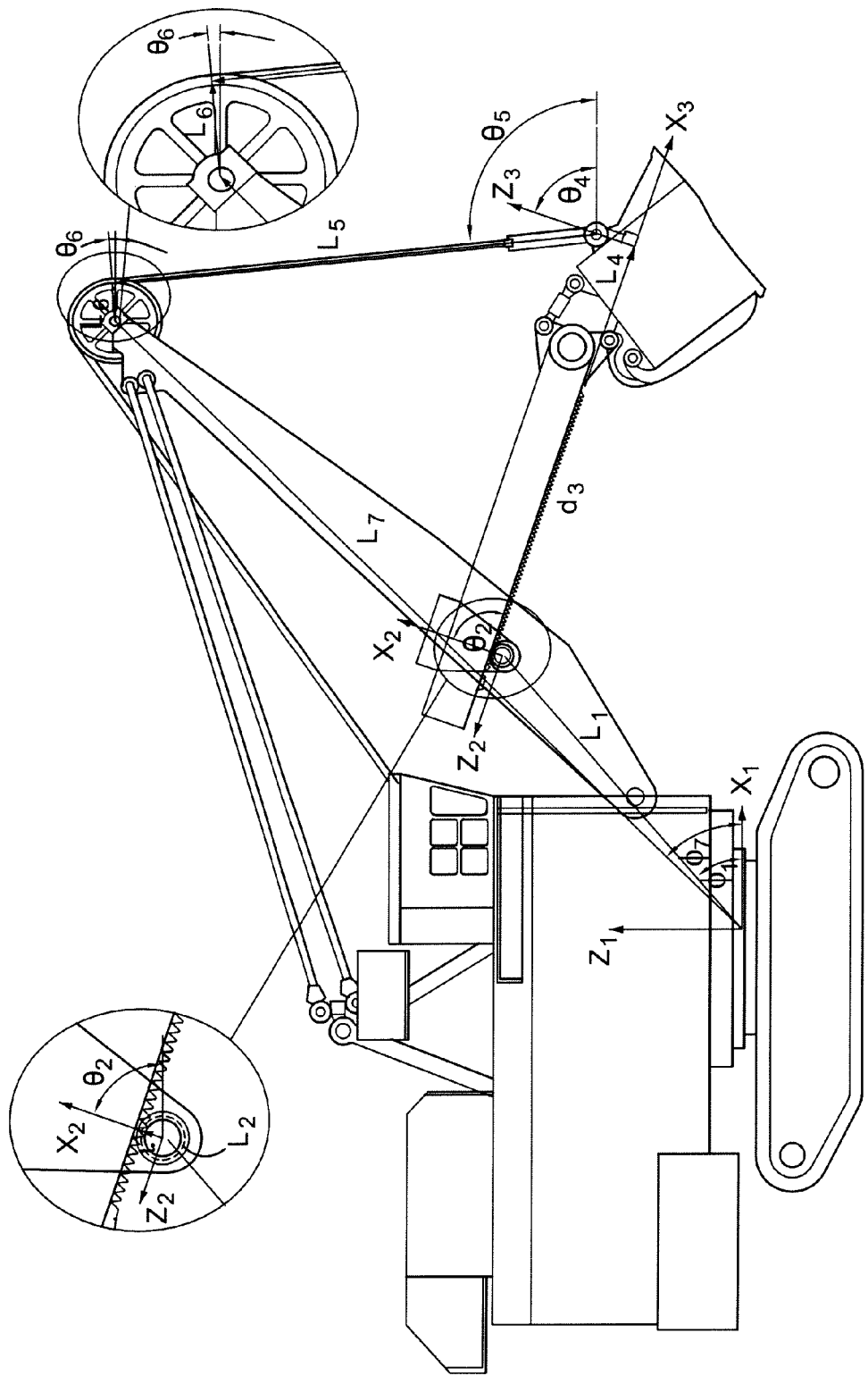
FIG. 9: Parameters and coordinate frames utilised in a system

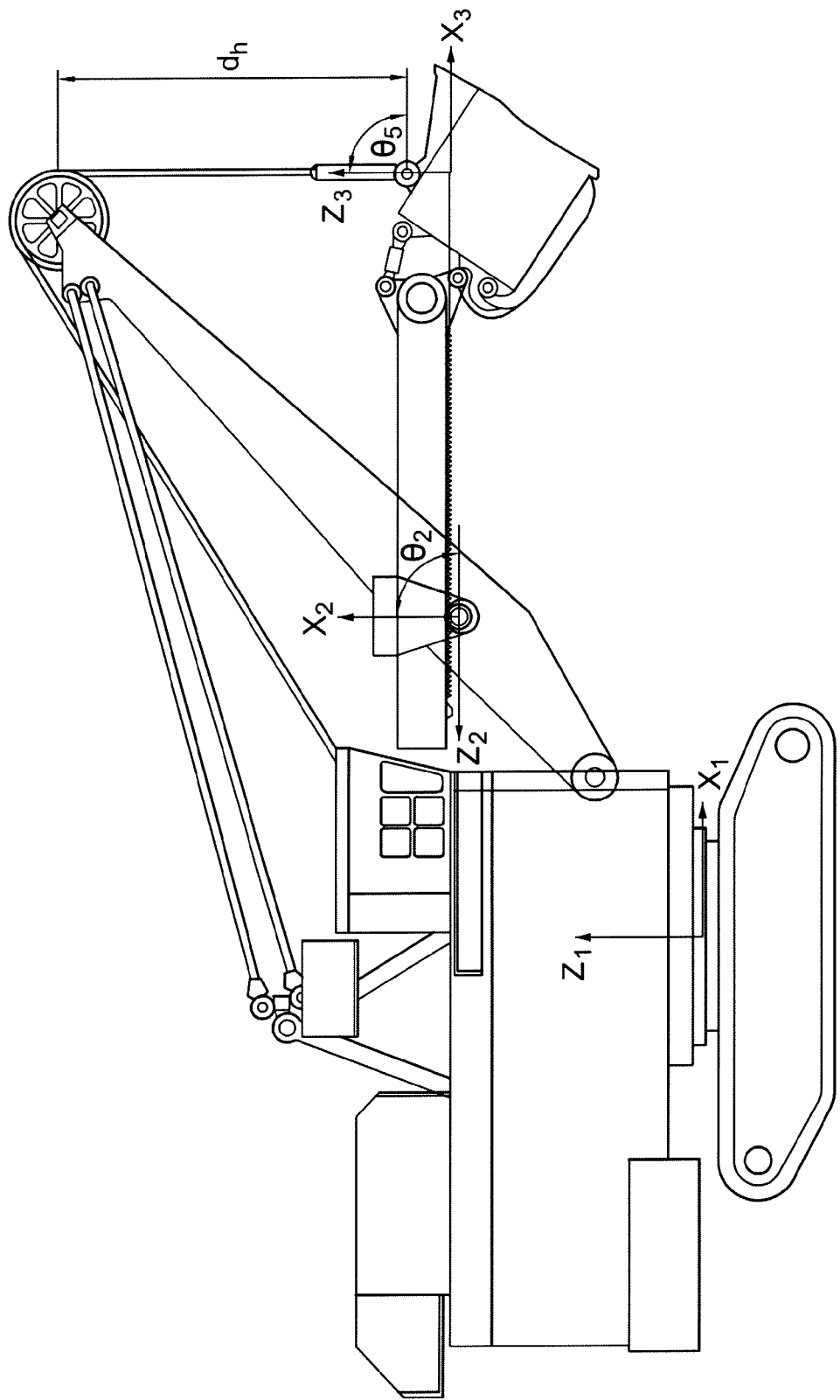
FIG. 10: Parameters and coordinate frames utilised in a system

PAYLOAD ESTIMATION OF WEIGHT BEARING MACHINERY USING MULTIPLE MODEL ADAPTIVE ESTIMATOR SYSTEM AND METHOD

CROSS REFERENCE TO RELATED APPLICATIONS

This application is the U.S. national phase of PCT/AU2007/000515 filed Apr. 19, 2007. PCT/AU2007/000515 claims benefit under the Paris Convention to AU 2006902069 filed Apr. 20, 2006. The disclosures of both of AU 2006902069 and PCT/AU2007/000515 are hereby incorporated herein by reference.

FIELD OF THE INVENTION

The present invention relates to a method and system for estimating the payload of a mining shovel and, in particular, discloses the utilisation of Kalman filtering in the estimation process.

BACKGROUND OF THE INVENTION

Electric mining shovels (EMS) are large electro-mechanical excavators commonly used in open-cut mining to load haul trucks. They are critical production units at most open-cut mine sites and there is an ongoing need to improve their productivity. FIG. 1 illustrates schematically one of these shovels.

It has been recognized since the 1950s that the capability to measure the weight of material collected by a mining shovel (or other excavator) at each dig can enhance safety and facilitate productivity improvement. The present invention is directed to ideas and methods from the field of optimal state and parameter estimation to address the problem of payload weighing for electric mining shovels.

One example of how knowledge of payload can be used to improve safety and productivity is by reducing the frequency of overloading of haul trucks. Truck overloading comes about primarily because mine sites perceive productivity benefits in loading the maximum possible amount of material into each truck. Most mine sites continue to favor the intuitive argument that pushing the limits of rated capacity increases operational efficiency. Moreover, they perceive the benefits are sufficiently great to pursue this objective aggressively. It is, for example, common practice to award operators performance bonuses if sufficient trucks are loaded within an 'optimal' band close to the truck capacities.

Truck overloading reduces safety, reduces the life of the truck, and increases down-time and the maintenance costs. To discourage overloading, maintenance and warranty contracts between a mine operator and a truck manufacturer, nowadays, will usually include a penalty clause that makes it mandatory to stop and dump the load where the truck stands if the scales on-board the truck show it to be overloaded. A dumped load results in a direct productivity loss that is compounded by the costs associated with having to rework the dumped material.

Modern trucks are fitted with on-board scales that are capable of monitoring the weight of material in their trays. These systems typically use suspension strut pressure strategies, and can provide weights accurate to plus or minus 3-5% when calibrated. It is generally accepted, however, that these on-board truck scales become accurate only after the truck is in motion, typically when second gear is reached on flat road. The weights reported at the loading point are generally held to be accurate only to plus or minus 20%, due to the influence of mechanical infelicities such as strut seal friction and strut rod bending in combination with other factors which cause the suspension to lock, such as rock spillage around the loading area and uneven distribution of material in the truck tray.

It normally takes four passes of a large modern electric shovel (with a nominal payload of approximately 80 t) to load a haul truck with a 300 t capacity. To manage the loading process, operators currently use information provided by truck scales (which are known to give poor estimates at the load point) in combination with their judgement. The main motivation for the development of on-shovel payload weighing is the belief that the risk of overloading can be better managed if the shovel operator knows, after each digging pass, how much material is in the bucket, together with the remaining capacity, of the truck tray. This information should empower making a 'go' or 'no go' decision prior to the final dig pass being dumped into the truck.

Other benefits of payload monitoring are envisaged. For example, giving operators real-time payload weights provides a source of feedback that can help them achieve better, more consistent, operation of the machine. There is, moreover, potential value in being able to monitor shovel performance on a cycle-by-cycle basis; the amount of material collected at each pass is widely held as a key performance indicator.

There have been several previous attempts to develop mining shovel payload systems and several commercial systems are currently available. While manufacturers typically quote accuracy to ±2%, the industry widely accepts that none of these systems can reliably achieve this. For a shovel with a nominal 80 t payload, worst case errors are likely to be as large as ±20 t.

Background work relevant to the payload estimation problem includes
(i) previously developed methods specifically applicable to electric mining shovels,
(ii) methods for estimating payload on other mining equipment such as hydraulic excavators and draglines or cognate equipment such as construction cranies, and
(iii) methods proposed in the robotics literature for the identification of the inertial parameters of robotic links and payload.

Methods for determining payloads on mining machines go back to the 1950s. These systems sometimes involved ingenious means for arriving at an estimate of payload, including analog computations using electrical and fluidic circuits. To the inventor's knowledge none of these systems proved successful; certainly none are in current wide spread use today. Most of the approaches in these early patents have been made redundant by the availability, circa 1980, of microprocessors that could be packaged for deployment on mining equipment. A starting assumption for this work is that any future practical system for payload estimation will be based off microprocessor technology and, accordingly, this review is limited to methods intended for computer-based implementation.

Payload Estimation for Electric Mining Shovels

Chang et al. in U.S. Pat. No. 6,225,574 use a static moment balance on the dipper handle assembly to compute payload. The method equates the moment applied to the dipper and handle assembly by gravity to that applied by the hoist ropes. By careful choice of coordinate frames, the equations are formed so as to be functions of dipper position and hoist rope force only, and are independent of the force applied by the crowd drive. This algorithm is known to be the basis for several commercial payload systems.

The hoist rope force is obtained by measuring the armature current and multiplying it by the motor torque constant and transmission ratios. The gravitation force is assumed to act through a known point (the centre-of-mass of the dipper and handle assembly) allowing the determination of an effective force. This force is then divided by the gravitational acceleration constant to give payload mass. Several estimates of payload can be made during the swing phase of the shovel cycle using this approach and these are averaged to determine the final payload estimate.

Chang et al. report that this method performs adequately when the shovel is stationary but gives poor results when in motion. They attempt to overcome this limitation by assigning a 'fuzzy' confidence factor between zero and one that weights each payload estimate in the overall sum. The calculation of these confidence factors is based on the observed speed and acceleration of the dipper at the time of measurement. The higher the speed or acceleration, the lower the confidence value; the lower the velocity and acceleration, the higher the confidence value. Confidence limits are used to cull outliers before the final payload estimate is computed as a weighted average of the instantaneous payload estimates.

This weighted-average approach appears to be an ad hoc attempt to deal with the forces resulting from motion of the machine. A mining shovel is a dynamic machine for which the motion on each drive is intermittent and predictable only in its gross character. An open question is the extent to which inertial forces associated with the acceleration and velocity of the dipper influence estimates of payload mass. This includes the centripetal forces acting when the shovel is swinging.

The method of Chang et al. also assumes that the payload centre of mass is invariant and is fixed at the centre of mass of the bucket for all payload sizes. The validity of this assumption is not tested and the sensitivity of payload estimates to errors in payload centre-of-mass is not reported. Moreover, no explicit attempt is made to compensate for drive friction or other sources of loss in arriving at estimates.

The payload estimation method described by Radomilovich in U.S. Pat. No. 4,677,579 uses a dynamic model that accounts for conservative and non-conservative effects in the hoist and crowd systems. The description of the approach includes the discussion of corrections for the inertial forces associated with the rotational inertia of the drive motors and the reduction gear train, the stretch of the hoist ropes, and the inertia of the bucket. Non-conservative losses due to friction and motor inefficiencies are also mentioned. Radomilovich uses a force balance similar to that of Chang et al., from which payload is estimated. The algorithm, as described, ignores several potentially important factors:

Swing motions are not included. Centrifugal and gyroscopic forces acting on the system are therefore neglected.

The algorithm requires motor accelerations, which are obtained by differentiating motor speed. Motor speed is determined from measurements of armature voltage and current using the steady-state, electrical, motor equations. The differentiation process amplifies noise in the speed signals. The difficulty of obtaining low noise acceleration signals argues for a methodology that does not require inferred measurement of the acceleration.

Motor position is calculated by integrating motor speed. As the armature voltage and current are noisy signals, the variance of the inferred position will grow unboundedly with time. In practice this method would require the shovel kinematics to be constantly recalibrated. This limitation can, of course, be overcome by direct position sensing of the motors.

The approach of Blair et al. in U.S. Pat. No. 4,809,794 is based on the observation that, in principle, knowing the coordinates of the centre of mass of the dipper allows determination of the strain that the weight of the dipper and its contents induce in any part of the boom or the support structure. Conversely, knowing the strain in a selected part of the support structure and the location of the center-of-mass of the dipper allows the weight of the dipper and its contents to be calculated. They propose the fitting of strain gauges to the support structure (on the A-frame structure that supports the boom) together with the use of experimentally or analytically determined influence coefficients, that are functions of dipper position, to relate measured strain to weight of the dipper, handle, and payload. A large part of this patent is given over to describing logic to establish when the shovel is swinging to the dump location, and there is comparatively little description of how the influence coefficients relating weight to strain might be determined. The algorithm averages the weights obtained at each sample over some part of this swing phase. The approach assumes a location for the payload mass-center and does not account for the dynamic loads associated with motion. The authors note that it is preferable to exclude from the averaging step, a number of the weights calculated at the start and end of the swing when these dynamic loads are often at their highest.

SUMMARY OF THE INVENTION

In accordance with a first aspect of the present invention, there is provided a method of payload estimation of weight bearing machinery, the method comprising the steps of: (a) creating a series of Kalman filter approximations to the weight bearing machinery for different levels of payload; (b) determining from the series an approximation to the current operating characteristics of the digger; (c) utilising the parameters derived from the step (b) determine an estimated payload of the weight bearing machinery.

The weight bearing machinery can comprise an electric mining shovel. The inputs to the Kalman filter can include weight bearing machinery drive control signals for controlling movement of the machinery. The members of the series of Kalman filter approximations simulate increasing payloads on the weight bearing machinery. The step (b) further comprising the steps of: forming a current model probability for each model and then forming a weighted sum of the models to determine an overall model.

BRIEF DESCRIPTION OF THE DRAWINGS

A preferred embodiment will now be described with reference to the accompanying drawings in which:

FIG. 8 illustrates the steps involved in the preferred embodiment;

FIG. 9 illustrates coordinate systems utilised in the mining shovel geometry;

FIG. 10 illustrates a further coordinate system utilised in the mining shovel system;

DESCRIPTION OF PREFERRED AND OTHER EMBODIMENTS

Figure 1:
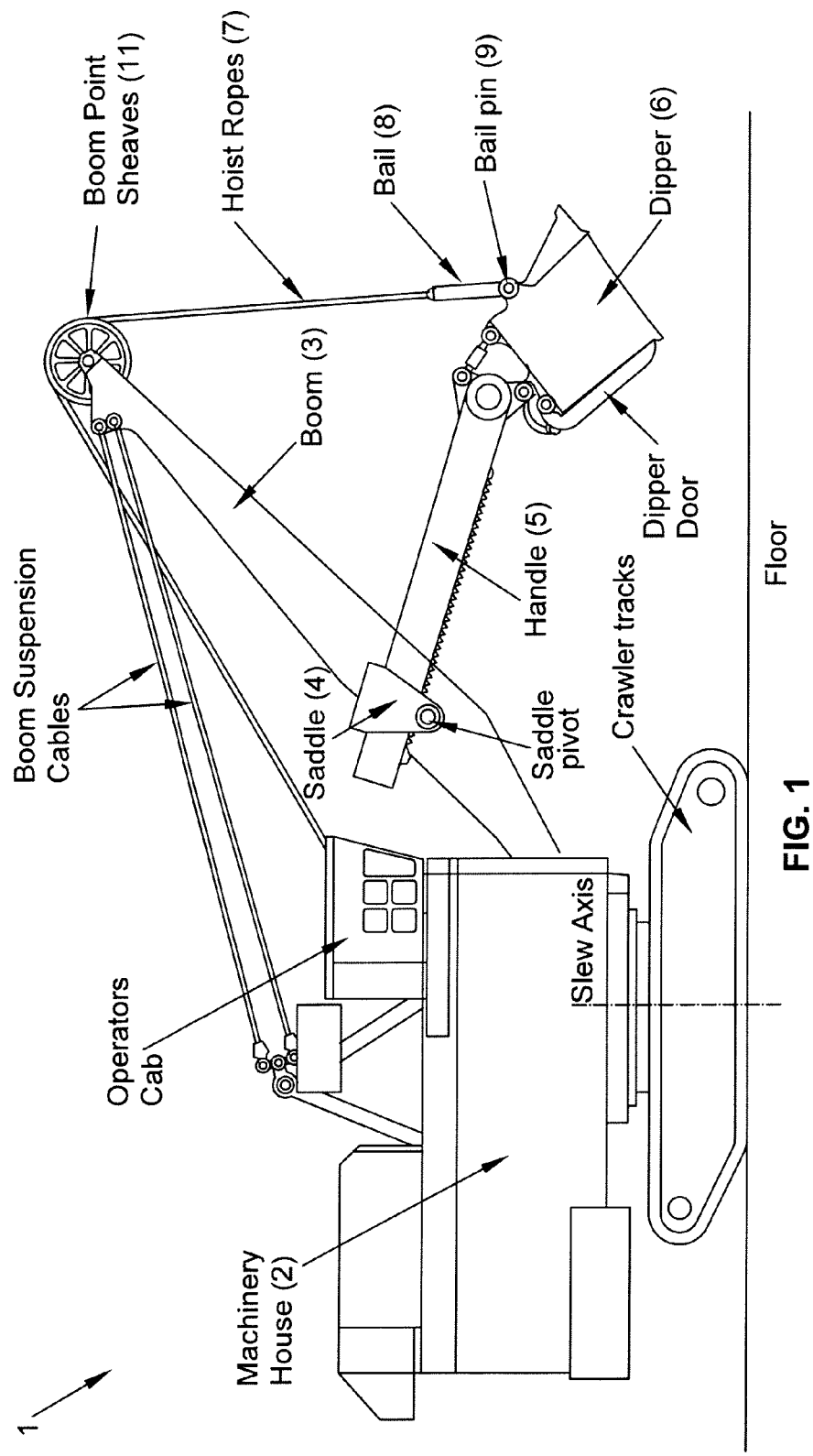
FIG. 1 illustrates schematically an electric mining shovel.
Figure 2:
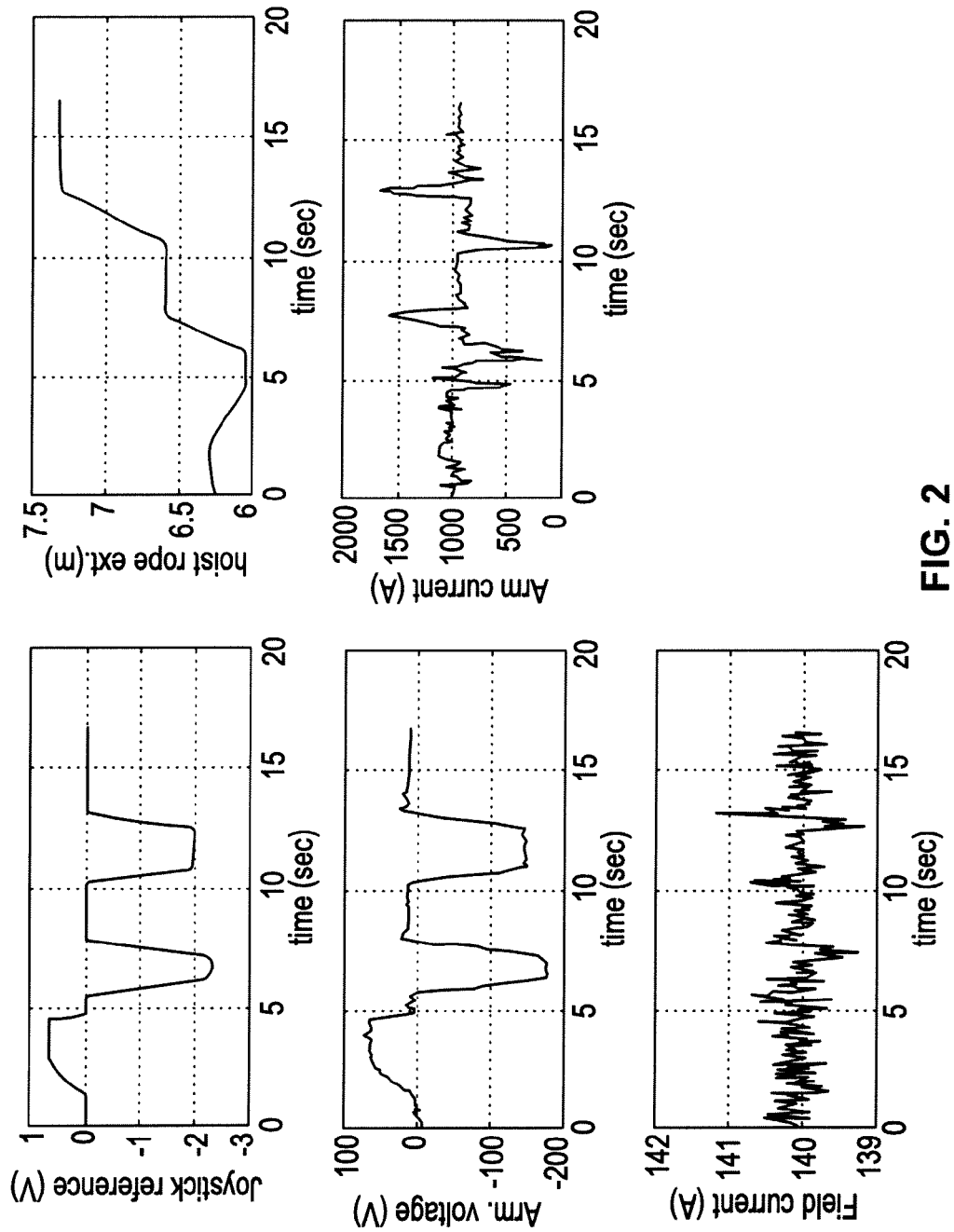
FIG. 2 is a plot of the hoisted drive signals measured in an electric mining shovel during a typical swing to dump.
Figure 3:
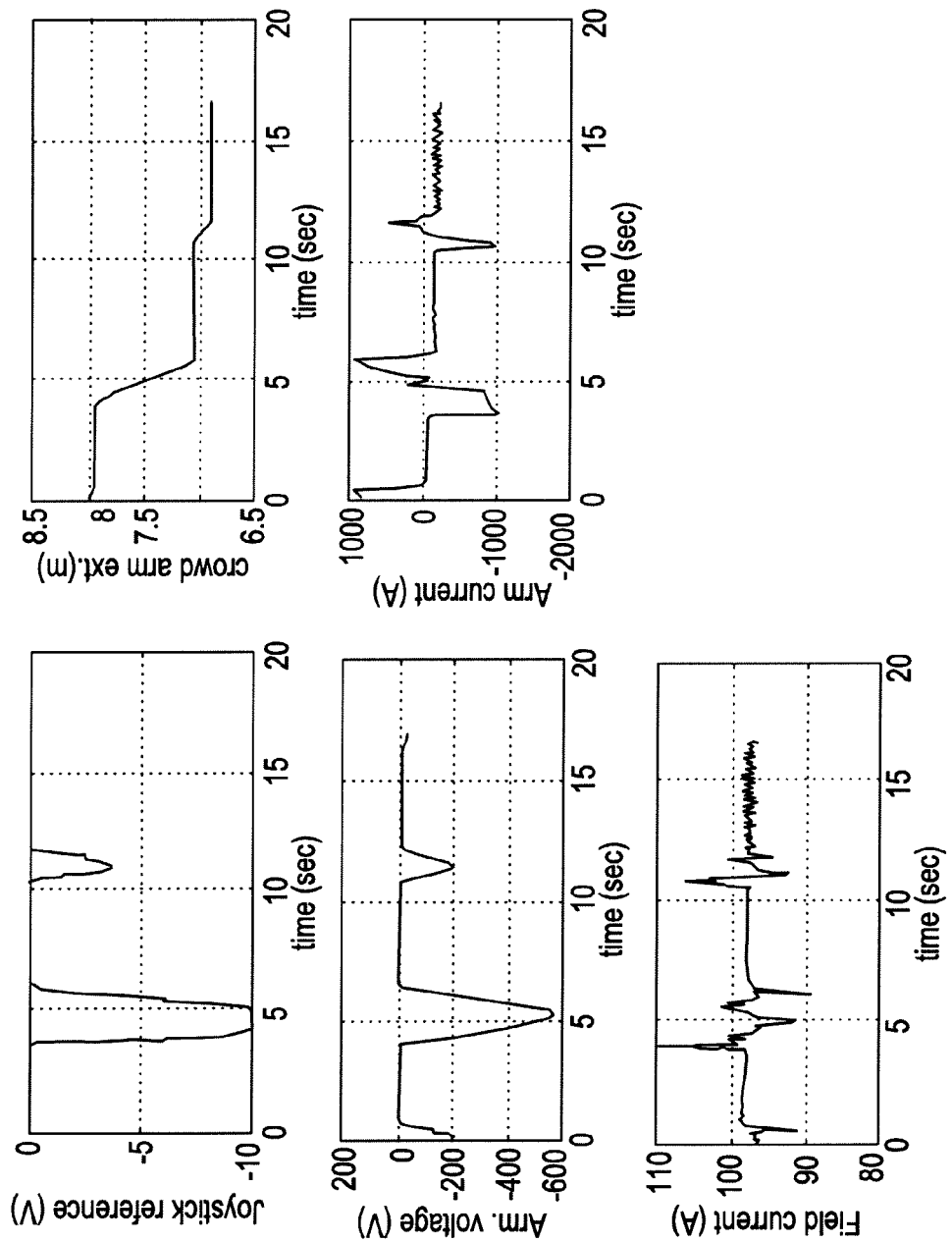
FIG. 3 illustrates a plot of the crowd drive signals of an electric mining shovel during a typical swing to dump.
Figure 4:
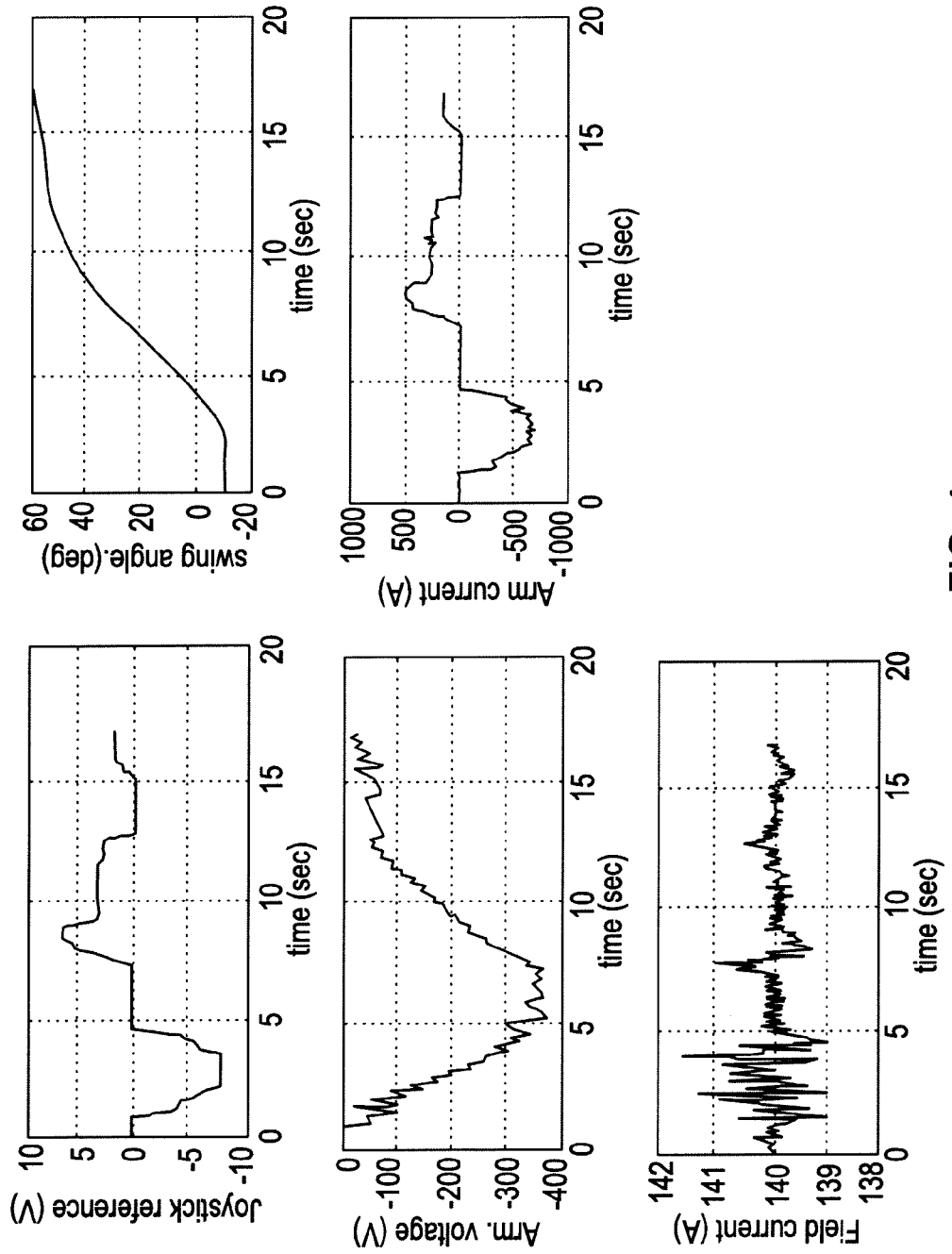
FIG. 4 illustrates a plot of the swing and drive signals of an electric mining shovel during a difficult swing to dump.
Figure 5:
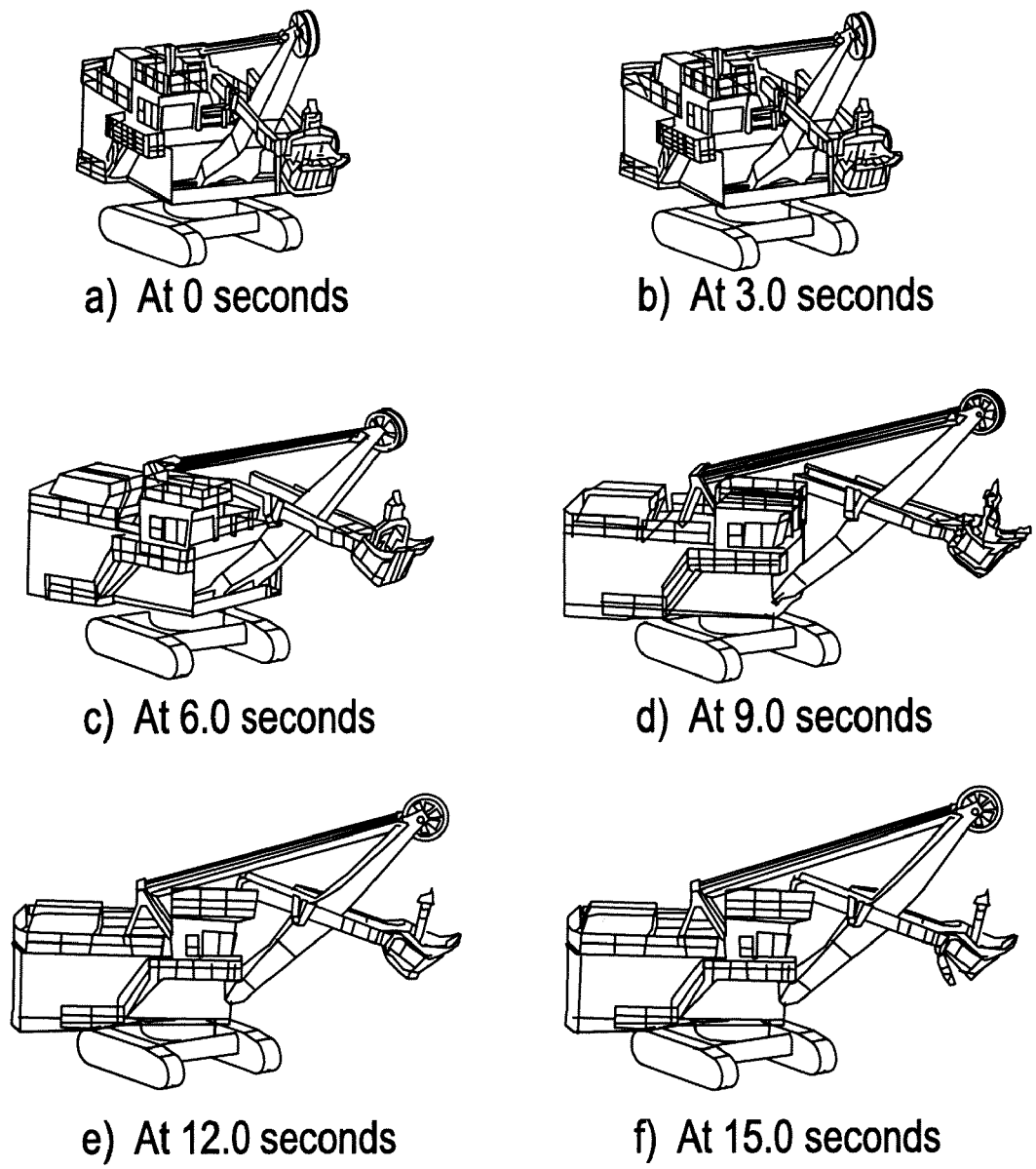
FIG. 5 illustrates the shovel configuration at three second time intervals during the swing-to-dump phase of the machine cycle.

The preferred embodiment starts from the view that dynamic loads cannot be a priori ignored. Hence we seek to include them. The rigid body dynamics of a mining shovel take the general form $$M(\theta)\ddot{\theta}+f(\theta,\dot{\theta})=\tau \quad (1)$$

where $\theta$ is a vector of configuration variables, e.g. joint angles; $\dot{\theta}$ is a vector of joint velocities; $\ddot{\theta}$ is a vector of joint accelerations; $M(\theta)$ is the mass matrix referred to (and dependent on) the relative configuration variables; $f(\theta,\dot{\theta})$ is the vector of velocity and gravity dependent generalized forces; and $\tau$ is a vector of generalized forces applied by the actuators.

A fundamental question is how to incorporate a model such as this into the problem formulation. In reviewing prior art, criticism was made of formulations requiring measurements of positions, velocities, and accelerations of the machine motions, on the grounds that the simultaneous measurement of all three variables for each degree of freedom is, at best, complex and may be impractical. A typical mining shovel will have joint resolvers providing position measurements and could be fitted with tachogenerators to provide velocity measurements, but rotational accelerometers that could be fitted to the motor shaft are not widely available and accelerometers fitted externally, for example to the dipper, would be difficult to maintain. It is reasonable to expect some compliance in the transmission and it is worth noting that, irrespective of where the accelerometers are placed, they would be non-collocated with respect to some system inertias.

It is common practice to overcome the limitation of not having direct velocity and acceleration measurements by numerically differentiating and double differentiating position sensors to get velocity or acceleration, or by integrating and differentiating velocity signals to get position and acceleration. Such schemes are often implemented by high-pass (differentiating) or low-pass (integrating) filters applied to the signals. This approach can become problematic if noise is present on the base signal. This noise is amplified by differentiation and the variance of an integrated signal grows unboundedly.

An alternative approach is to use the causal (or forward) form of the dynamics to predict future motions based on applied forces. This immediately casts the problem into a form suitable for application of optimal state and parameter estimation methods. The advantages of formulating the problem this way are (i) that acceleration measurements are not needed, (ii) that measurement noise and model uncertainty are included naturally within the formulation, and (iii) that the causal structure of the model attenuates noise on driving signals, i.e. $\|M^{-1}\|$ is small. The major disadvantage of this approach is that the model retains an ordinary differential equation structure and so the solution procedure is more complicated than that required for the algebraic extraction of payload estimates from the equations of motion.

An optimal state and parameter estimator seeks the best estimates (in a minimum variance sense) of the system dynamic state and model parameters. It provides an implicit, but nevertheless, clean and effective framework for accounting for the inertial loads associated with machine motion.

The preferred embodiment uses the Kalman filter to determine a weight estimate. The Kalman filter is a recursive linear estimator that calculates a minimum variance estimate of the state of a dynamic system using observations that are linearly related to this state. The Kalman filter is optimal in the sense that it minimizes the mean squared estimation error under the assumptions that the state being estimated is that of a linear system driven by Gaussian white noise from which periodic measurements, corrupted by Gaussian white noise, are made.

The Process Model

The process model is used by Kalman filter based method to predict the future state of a system from an estimate of the current state and knowledge of the control inputs. It encodes a priori knowledge about the dynamics of the system under study, and, by enabling the prediction of future system state and state covariance from current estimates of state and state covariance, it propagates information relating to the system state forward in time. In doing so it provides the mechanism for temporal fusion of new information in the form of sensor measurements with knowledge of the current knowledge of the system state.

Kalman filter theory assumes that a linear, stochastic, difference equation can be used to model the system and that measurements made from the system are linearly related to the system states.

The equations describing the system model and the measurements take the form $$x(t_i)=\Phi(t_i,t_{i-1})x(t_{i-1})+\Gamma(t_{i-1})u(t_{i-1})+G(t_{i-1})w(t_{i-1}), \quad (2)$$

$$z(t_i)=H(t_i)x(t_i)+v(t_i), t_i=\Delta t, \quad (3)$$

where $x(t_i)$ is the n-dimensional state vector; $u(t_i)$ is the l-dimensional vector describing the system inputs; and $w(t_i)$ is the s-dimensional process noise vector representing uncertainty in the inputs and uncertainty resulting from unmodelled dynamics. The matrix $\Phi(t_i, t_{i-1})$ describes the system dynamics and matrices $\Gamma(t_{i-1})$ and $G(t_{i-1})$ describe the distribution of inputs and process noise to the states. The variable $z(t_i)$ is the m-dimensional measurement vector; $v(t_i)$ is the m-dimensional vector of measurement noise; and $H(t_i)$ is the measurement matrix describing how the measurements relate to the states. The sample period, or time between consecutive measurements, is $\Delta t$.

The process noise, $w(t_i)$, and the measurement noise, $v(t_i)$, are assumed to be independent zero-mean, white Gaussian noise sequences, $$E\{w(t_i)\}=0, \quad (4)$$

$$E\{v(t_i)\}=0, \quad (5)$$

$$E\{w(t_i)w(t_j)\}=Q(t_i)\delta_{ij}, \quad (6)$$

$$E\{v(t_i)v(t_j)\}=R(t_i)\delta_{ij}, \quad (7)$$

$$E\{w(t_i)v(t_j)\}=0. \quad (8)$$

The process noise accounts for discrepancies between the process model and the actual behaviour of the plant. The process noise has three components: (i) disturbances that act on the control inputs including measurement errors on the inputs and unmodelled changes in the inputs which are usually assumed to be constant over each prediction step; (ii) uncertainty in model parameters due to both errors in specified values or unmodelled changes in parameters with time; and (iii) stabilizing noise that compensate for plant dynamics not modelled by the process model. It is worth noting that stabilizing noises may not have a well-defined physical basis, but are required to ensure successful filter operation. The process noise covariance, $Q(t_i)$, is positive semidefinite.

The measurement noise describes uncertainties associated with making measurements from sensors. The measurement noise covariance, $R(t_i)$, is positive definite for all i.

The initial condition of the system state is modelled as a Gaussian random vector with known mean and covariance:

$$E\{x(t_0)\} = \hat{x}_0,$$

$$E\{[x(t_0) - \hat{x}_0][x(t_0) - \hat{x}_0]^T\} = P(t_0).$$

Derivation of the Kalman Filter

There are several known approaches to deriving the Kalman filter including minimum variance, maximum likelihood, and maximum a posteriori (MAP) approaches. The preferred embodiment uses the MAP formulation because it leads most naturally to the multiple model parameter estimation algorithm used for payload estimation.

Summary of Equations

The optimal state estimate and its covariance are predicted from time $t_{i-1}$ to the current time $t_i$ using $$\hat{x}(t_i^-) = \Phi(t_i, t_{i-1})\hat{x}(t_{i-1}^+) + \Gamma u(t_{i-1}), \tag{9}$$

$$P(t_i^-) = \Phi(t_i, t_{i-1})P(t_{i-1}^+)\Phi(t_i, t_{i-1})^T + G(t_i)QG(t_i)^T. \tag{10}$$

The purpose of the prediction is that it permits the temporal fusion of data.

At time $t_i$ the measurement $z(t_i)$ is incorporated into the state estimate giving the following equations for the updated state estimate and its covariance, $$A(t_i) = H(t_i)P(t_i^-)H^T(t_i) + R(t_i), \tag{11}$$

$$K(t_i) = P(t_i^-)H^T(t_i)A(t_i)^{-1}, \tag{12}$$

$$r(t_i) = z(t_i) - H(t_i)\hat{x}(t_i^-), \tag{13}$$

$$\hat{x}(t_i^+) = \hat{x}(t_i^-) + K(t_i)r(t_i), \tag{14}$$

$$P(t_i^+) = P(t_i^-) - K(t_i)H(t_i)P(t_i^-). \tag{15}$$

Figure 6:
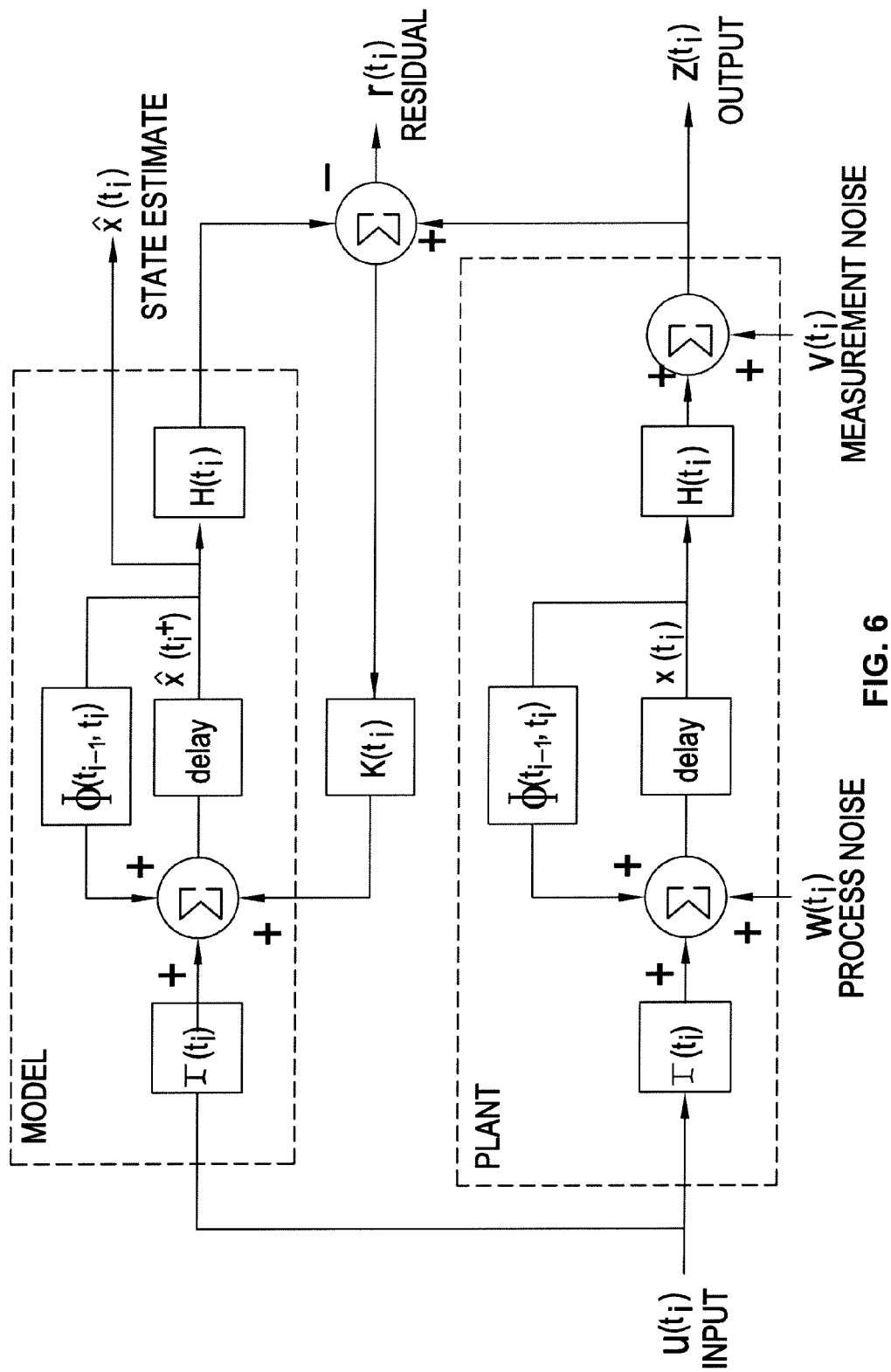
FIG. 6 illustrates a block diagram structure of the Kalman filter utilised in the preferred embodiments.

FIG. 6 shows the block diagram structure of the above formulation of a Kalman filter.

The Extended Kalman Filter

The Kalman filter provides the optimal state estimate of a discrete-time, linear system, with discrete, linear measurements. However, all systems are, to some extent, non-linear and in many the non-linearities are significant enough that the linear Kalman filter cannot be applied. Electric mining shovels fall into this category because the equations of motion that govern them are dependent on configuration and velocity. While these dynamics are non-linear, they are smooth in the sense that they can be everywhere differentiated.

The usual approach for solving state estimation problems on non-linear systems with "smooth" dynamics is the extended Kalman filter or EKF. The EKF essentially involves the application a linear methodology to a non-linear problem by linearizing the non-linear state and measurement equations about the state trajectory. The EKF is popular because it is conceptually simple and, for a given non-linear system, it provides best linear estimator measured by minimum mean squared error, and so, in this sense, it is optimal.

The Kalman filter equations given above apply to discrete time system. Where the non-linear dynamics of the system is continuous, it is common to use a hybrid continuous-discrete process model. The non-linear continuous dynamics are used for the prediction step, usually through the application of a standard ordinary differential equations solver such as a Runge-Kutta method. The correction step is then completed using a discretized form of the linearized dynamics. This leads to a variant of the EKF known as continuous-discrete extended Kalman filter (CDEKF).

The derivation of the CDEKF follows from arguments of linearization and the Kalman filter algorithms. Specifically the filter is derived by linearizing the state and observation equations using a Taylor's series expansion.

The state and measurement equations are assumed to have the following form. State and measurement equations:

$$\dot{x}(t) = f[x(t), u(t)] + Gw(t), \tag{16}$$

$$z(t_i) = h[x(t_i)] + v(t_i). \tag{17}$$

Non-linear system equations Non-linear measurement equations

Propagation Equations:

$$\hat{x}(t_i^-) = \hat{x}(t_{i-1}^+) + \int_{t_{i-1}}^{t_i} f[\hat{x}(t_{i-1}^+), u(t_{i-1})] dt, \tag{18}$$

$$P(t_i^-) = \Phi(t_i, t_{i-1})P(t_{i-1}^+)\Phi(t_i, t_{i-1})^T + G(t_i)QG(t_i)^T, \tag{19}$$

Update Equations $$A(t_i) = H(t_i)P(t_i^-)H^T(t_i) + R(t_i), \tag{20}$$

$$K(t_i) = P(t_i^-)H^T(t_i)A(t_i)^{-1}, \tag{21}$$

$$r(t_i) = z(t_i) - h[\hat{x}(t_i^-)], \tag{22}$$

$$\hat{x}(t_i^+) = \hat{x}(t_i^-) + K(t_i)r(t_i), \tag{23}$$

$$P(t_i^+) = P(t_i^-) - K(t_i)H(t_i)P(t_i^-), \tag{24}$$

where $$\Phi(t_i, t_{i-1}) = \exp(F(t_{i-1})\Delta t), \tag{25}$$

$$F(t_{i-1}) = \frac{\partial f(x, u)}{\partial x}\bigg|_{\substack{x(t) = \hat{x}(t_{i-1}^+), \\ u(t) = u(t_{i-1})}}, \tag{26}$$

$$H(t_i) = \frac{\partial h(x)}{\partial x}\bigg|_{x(t) = \hat{x}(t_i^-)}, \tag{27}$$

$$\Delta t = t_i - t_{i-1}. \tag{28}$$

It is clear that the EKF is very similar to the Kalman filter algorithm with the substitution of transition and measurement matrices by their linearized equivalents.

- The EKF does not estimate state, but rather perturbations of state from an initial configuration. This is easily accommodated by adding the estimated state perturbation to the initial state.
- The EKF requires a linearized model that must be computed from an approximate knowledge of state. This imposes a requirement for the filter to be initialized accurately to ensure that linearizations a valid descriptions of the dynamics.
- Unlike the Kalman filter the, Kalman gain and the state covariance do not converge to a steady state. Moreover it is necessary to continually re-evaluate the Jacobian matrices.
- If the predicted state trajectory drifts too far from the actual state trajectory, the true covariance will become much larger than the estimated covariance.
- If the state or measurement equations are highly non-linear and the posterior density is non-Gaussian, the EKF may give a high estimation error.

These points notwithstanding, it is possible to achieve acceptable performance from an EKF in many applications.

The Multiple Model Adaptive Estimator

The Kalman filter and extended Kalman filter provide a method for establishing the dynamic state of a system by balancing the contribution made by a deterministic dynamic process model with that given by the measurement model. The core reason for undertaking state estimation when the objective is to estimate payload mass (and possibly other system parameters) is to use state estimates to implicitly compensate for the inertial loads resulting from machine motion.

The Kalman filter framework extends naturally to the estimation of system states and parameter simultaneously though a multiple model adaptive estimator (MMAE). The approach assumes the parameters to be estimated are constant or piecewise constant.

Generally, a system parameter can vary over a continuous range usually between maximum and a minimum values. The payload mass in the dipper of an electric mining shovel can take any value between zero (dipper empty) and the and a maximum capacity (associated with the dipper being full). The multiple model approach assumes that a parameter of interest, here the payload mass, can take on one of a number, say r, discrete values between these maximum and minimum limits. Denote these by $$M \in \{M_j\}_{j=1}^r. \quad (29)$$

The idea is to hypothesize r system models, one for each of the r values, to estimate state of each model using a Kalman filter, and to determine the probability that each model is correct from the statistical properties of the innovation sequence generated by the filter for that model. Over time the most accurate model is assigned the largest probability while the less accurate models are assigned lower probabilities. Although payload mass has been used as an example in this discussion, we can in principle use this method on any combination of parameters such as payload mass and payload centre of mass to define a model.

The preferred embodiment uses the MAP approach to obtain an optimal estimate for the system parameters. However, whereas for the state estimation we were trying to find the most likely estimate of a state $x(t_i)$ given the measurement sequence $Z(t_i)$, we are now looking to determine the most likely model $M_j$, given $Z(t_i)$.

The probability that a model is correct, given the measurement sequence $Z(t_i)$, can expressed recursively as, $$P\{M_j \mid Z(t_i)\} = P\{M_j \mid z(t_i), Z(t_{i-1})\}, \quad (30)$$

$$= \frac{f(z(t_i) \mid M_j, Z(t_{i-1}))P\{M_j \mid Z(t_{i-1})\}}{f(z(t_i) \mid Z(t_{i-1}))},$$

$$= \frac{f(z(t_i) \mid M_j, Z(t_{i-1}))P\{M_j \mid Z(t_{i-1})\}}{\sum_{i=1}^{r} f(z(t_i) \mid Z(t_{i-1}), M_i)P\{M_i \mid Z(t_{i-1})\}}.$$

In the above expression we have made use of Bayes' rule and marginalization. If we use the following notation, $$\mu_j(t_i) = P\{M_j \mid Z(t_i)\},$$

$$\mu_j(t_{i-1}) = P\{M_j \mid Z(t_{i-1})\},$$

then Eqn. 30 can be written as, $$\mu_j(t_i) = \frac{f(z(t_i) \mid M_j, Z(t_{i-1}))\mu_j(t_{i-1})}{\sum_{k=1}^{r} f(z(t_i) \mid M_k, Z(t_{i-1}))\mu_k(t_{i-1})}. \quad (31)$$

Note that if we have r models, we have r of these equations. The probability assigned to each model changes through times as more information becomes available. The initial condition is $$P(M_j \mid Z^0) = \mu_j(0),$$

where $\mu_j(0)$ is the a priori probability that model j is the correct one. Note that the model probabilities obey the normalizing condition $$\sum_{j=1}^{r} \mu_j(t_i) = 1.$$

Equation 31 is a hybrid PDF, with both discrete probabilities and continuous PDFs. Looking at the individual terms in this expression we see that $\mu_j(t_{i-1})$ is the probability that model j is correct given the measurement sequence up to the previous time step. The probability distribution $f(z(t_i) \mid M_j, Z(t_{i-1}))$ can be expressed for model $M_j$ as, $$f(z(t_i) \mid M_j, Z(t_{i-1})) = |2\pi A_j(t_i)|^{-1/2} \exp\left\{-\frac{1}{2} r_j(t_i)^T A_j^{-1} r_j(t_i)\right\} \quad (32)$$

In the above equation, the residual $r_j(t_i)$ and its covariance $A_j(t_i)$ have been generated by assuming that $M=M_j$.

An estimate $\hat{M}$ of the parameter M can then be found as a sum of the individual parameters weighted by their probabilities, i.e.

$$\hat{M}(t_i) = \sum_{j=1}^{r} M_j \mu_j(t_i). \quad (33)$$

Similar expressions can derived for the combined state estimate, $$\hat{x}(t_i^+) = \sum_{j=1}^{r} \mu_j(t_i)\hat{x}_j(t_i^+), \quad (34)$$

and state estimate covariance, $$\hat{P}(t_i^+) = \sum_{j=1}^{r} \mu_j(t_i)\{P_j(t_i^+) + [\hat{x}_j(t_i) - \hat{x}(t_i)][\hat{x}_j(t_i) - \hat{x}(t_i)]^T\}. \quad (35)$$

This is a sum of probability weighted terms from each model and consists of two components. The variance on the estimate of the j-th model and an outer product due to the fact that $\hat{x}(t_i)$ is not the same as $\hat{x}_j(t_i)$.

Figure 7:
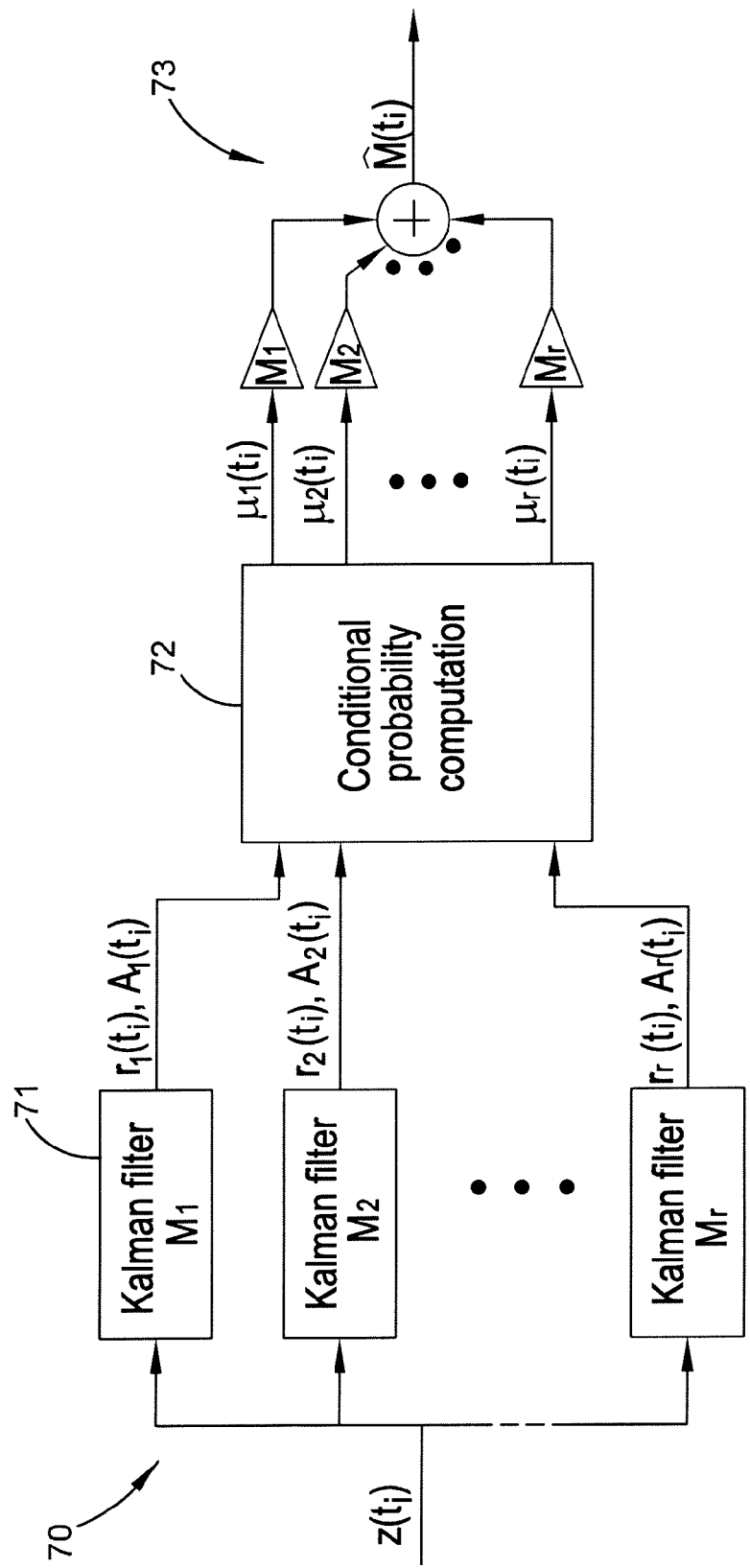
FIG. 7 illustrates an overview of the multiple model algorithm utilised in the preferred embodiment.

Essentially, the multiple model approach of the preferred embodiment is as illustrated in 70 in FIG. 7 and involves running a bank of r independent Kalman filters e.g. 71, with each Kalman filter having a distinct model. The residual, residual covariance, and the prior model probability are then used to determine the current model probability 72. The updated probabilities are then used in a weighted sum 73 to determine the current parameter estimate. The MMAE algorithm is detailed in FIG. 8 in more detail.

Algorithm explanatory notes
1. The initialization step sets initial conditions for the state estimate, state covariance. These are typically equal for all of the models. The a priori probability of each parameter is also set. If no prior information is available on parameter probabilities, the probability distribution should be flat and all initial probabilities should be equal to $1/r$.
2. The main for-loop begins at the start of the swing and finishes at the end of the swing. In practice start and finish times of the parameter estimator are determined by a cycle decomposition algorithm.
3. In the second for-loop the Kalman filter is run for each for model. It independently updates and state estimate and state covariance for each model.
4. The integration for the state prediction is achieved using a 4th order Runge-Kutta routine or similar ordinary differential equations solver.

When the second for-loop is completed the model probabilities are updated and a new parameter estimate is determined.

Machine Geometry and Coordinate Frames

FIG. 9 shows the parameters (lengths and angles) used to describe the geometry of P&H-class electric mining shovels and the coordinate frames used to describe relative positions of major moving assemblies of these machines. Lengths labeled l and angles labeled $\phi$ are fixed by design; length labeled d and angles labeled $\theta$ vary under machine motion.

Four frames are needed to describe the relative position of the major shovel assemblies. The world frame is denoted $O_0 x_0 y_0 z_0$; the $O_1 x_1 y_1 z_1$-frame is embedded in the machine house; the $O_2 x_2 y_2 z_2$-frame in the saddle; and the $O_3 x_3 y_3 z_3$-frame in the dipper. The x- and z-axes of all the body-fixed frames are in the sagittal plane of the machine house, that is the plane parallel to the plane of projection shown in FIG. 9 containing the swing axis. The y-axes of all frames are normal to this plane.

Four-by-four homogeneous transformation matrices can be used to describe the relationship between frames. We denote the matrix describing the transform from $O_i x_i y_i z_i$ to $O_j x_j y_j z_j$ by $D_{i \to j}$ and note that the action of this matrix maps (homogeneous) points in the j-frame to the i-frame. For instance, if p is a point whose location is known in $O_3 x_3 y_3 z_3$, fixed in the bucket, then the coordinates of that point in frame $O_0 x_0 y_0 z_0$ can be found from.

$$p' = D_{0 \to 3} p.$$

The structure of $D_{i \to j}$ is $$D_{i \to j} = \begin{pmatrix} R_{i \to j} & t_{i \to j} \\ 0 & 1 \end{pmatrix}$$

where $R_{i \to j}$ is a 3×3 rotation matrix and $t_{i \to j}$ is a 3-dimensional translation vector. Four-by-four homogeneous transformation matrices commute according to $$D_{i \to k} = D_{i \to j} D_{j \to k}.$$

The world frame $O_0 x_0 y_0 z_0$ provides an inertial reference frame when the shovel tracks are locked. The origin of this frame is located at the interface between the upper surface of the tracks and the underside surface of the machine house. The $z_0$-axis collinear with the swing axis. The $x_0$-axis points in the direction of forward travel of the crawler tracks, and the $y_0$-axis completes a right-handed trihedral coordinate frame.

The origin $O_1$ of frame $O_1 x_1 y_1 z_1$ is coincident with $O_0$ and $z_1$ is collinear with $z_0$. When $\theta_1 = 0$, frames $O_0 x_0 y_0 z_0$ and $O_1 x_1 y_1 z_1$ coincide. A positive angle $\theta_1$ corresponds to an anti-clockwise rotation of the machine house relative to the tracks when viewed from above. The homogeneous transformation matrix $D_{0 \to 1}$ is given by $$D_{0 \to 1} = \begin{pmatrix} \cos\theta_1 & -\sin\theta_1 & 0 & 0 \\ \sin\theta_1 & \cos\theta_1 & 0 & 0 \\ 0 & 0 & 1 & 0 \\ 0 & 0 & 0 & 1 \end{pmatrix}. \quad (36)$$

Frame $O_2 x_2 y_2 z_2$ is fixed to the saddle with $O_2$ at the center of rotation of the saddle. When $O_2$ is equal to 0, the coordinate directions of $O_2 x_2 y_2 z_2$ are parallel to those of $O_1 x_1 y_1 z_1$. The displacement matrix describing the rigid body displacement from Frame 1 to Frame 2 is given by $$D_{1 \to 2} = \begin{pmatrix} \cos\theta_2 & 0 & -\sin\theta_2 & l_1 \cos\phi_1 \\ 0 & 1 & 0 & 0 \\ \sin\theta_2 & 0 & \cos\theta_2 & l_1 \sin\phi_1 \\ 0 & 0 & 0 & 1 \end{pmatrix}, \quad (37)$$

where design parameters $l_1$ and $\phi_1$ are as shown in FIG. 9

The origin $O_3$ of $O_3 x_3 y_3 z_3$ is located as follows. The saddle angle ($\theta_2$) is set equal to 90 degrees so that the handle is horizontal. The handle is then displaced such that the hoist rope falls vertically ($\theta_5 = 90$ degrees and $\theta_6 = 0$ degrees). The origin $O_3$ is located at the intersection of the pitch-line of the handle-rack and the hoist rope; $z_3$ is set to be collinear with the axis of the hoist rope; $x_3$ is set parallel to the pitch-line of the handle-rack. Note that axis $x_2$ is orthogonal to axis $x_3$. The displacement matrix describing the rigid body displacement $D_{2 \to 3}$ is given by $$D_{2 \to 3} = \begin{pmatrix} 0 & 0 & 1 & l_2 \\ 0 & 1 & 0 & 0 \\ -1 & 0 & 0 & -d_3 \\ 0 & 0 & 0 & 1 \end{pmatrix}. \quad (38)$$

The multiplication of the above Eqns. gives the location of $O_3 x_3 y_3 z_3$ in $O_0 x_0 y_0 z_0$, namely $$D_{0 \to 3} = D_{0 \to 1} D_{1 \to 2} D_{2 \to 3}$$

$$= \begin{pmatrix} \cos\theta_1 \sin\theta_2 & -\sin\theta_1 & \cos\theta_1 \cos\theta_2 & \cos\theta_1(l_1 \cos\phi_1 + l_2 \cos\theta_2 + d_3 \sin\theta_2) \\ \sin\theta_1 \sin\theta_2 & \cos\theta_1 & \sin\theta_1 \cos\theta_2 & \sin\theta_1(l_1 \cos\phi_1 + l_2 \cos\theta_2 + d_3 \sin\theta_2) \\ -\cos\theta_2 & 0 & \sin\theta_2 & l_1 \sin\phi_1 + l_2 \sin\theta_2 - d_3 \cos\theta_2 \\ 0 & 0 & 0 & 1 \end{pmatrix}.$$

Bail Pin Location

The dipper undergoes three parameter motion and it is useful to have an identified point on the dipper whose spatial location serves identify the position of $O_3 x_3 y_3 z_3$. For this we use the bail-pin, located at $b_3 = (0, 0, l_4, 1)$ in $O_3 x_3 y_3 z_3$. The coordinates of the bail-pin in $O_0 x_0 y_0 z_0$ are $$b_0 = D_{0 \to 3} b_3 = \begin{pmatrix} \cos\theta_1 (l_1 \cos\phi_1 + (l_2 + l_4)\cos\theta_2 + d_3 \sin\theta_2) \\ \sin\theta_1 (l_1 \cos\phi_1 + (l_2 + l_4)\cos\theta_2 + d_3 \sin\theta_2) \\ l_1 \sin\phi_1 + (l_2 + l_4)\sin\theta_2 - d_3 \cos\theta_2 \\ 1 \end{pmatrix} \quad (39)$$

Constraint Equations

The swing angle, $\theta_1$, the pivot angle, $\theta_2$, and the crowd extension, $d_3$, parameterize the displacement and rotation of the body fixed frames relative to the world frame. We group these configuration variables as follows:

$$\theta = (\theta_1, \theta_2, d_3)^T. \quad (40)$$

The displacements of the swing motor $\theta_s$, crowd motor $\theta_c$, and hoist motor $\theta_h$ can be similarly grouped:

$$\psi = (\theta_s, \theta_c, \theta_h)^T. \quad (41)$$

The values of $\theta$ determine $\psi$ and vice versa. These mappings are not bijective, however, within the physical working range of these variables their correspondence is one-to-one. Note that the specification of either $\theta$ or $\psi$ determines the inclination of the hoist rope, a seventh variable, labeled $\theta_5$ in FIG. 9.

To build up constraint equations, start by noting the dependent coordinates $\theta_s$ and $\theta_c$ are related $\theta_1$ and $d_3$ by transmission ratios leading to $$0 = \gamma_1(\theta, \psi) = \begin{bmatrix} G_s \theta_1 - \theta_s \\ G_c d_3 - \theta_c \end{bmatrix}, \quad (43)$$

where $G_s$ is the transmission ratio of the swing drive and $G_c$ is the transmission ratio of the crowd drive.

The constraint equations relating $\theta_2$ and $\theta_5$ to $\theta_c$ and $\theta_h$ can be developed using the vector loop shown in FIG. 10. To simplify the notation, we work in a complex plane mapped to the physical $(x_1, z_1)$-plane with the real axis collinear with $x_1$ and imaginary axis with $z_1$.

Summing vectors in the vector loop of FIG. 10 where the vector $z_i$ is expressed as a complex variable gives $$0 = \xi(\theta, \psi, \theta_5) = z_1 + z_2 + z_3 + z_4 + z_5 - z_6 z_7,$$

which can be expanded to give, $$0\xi(\theta, \psi, \theta_5) = l_1 e^{i\phi_1} + l_2 e^{i\theta_2} + d_2 e^{i(\theta_2 - \pi/2)} + l_4 e^{i\theta_4} + d_5 e^{i\theta_6} - l_6 e^{i\theta_7}. \quad (44)$$

where the variables $l_i$, $d_i$, $\theta_i$ and $\phi_i$ are as defined in FIG. 10. Then using the following relations determined by inspection, $$\theta_6 = \theta_5 - \frac{\pi}{2}, \quad (45)$$

$$\theta_4 = \theta_2, \quad (46)$$

Eqn. 44 can be written as, $$\xi(\theta, \psi, \theta_5) = l_1 e^{i\phi_1} + l_2 e^{i\theta_2} + d_3 e^{i(\theta_2 - \pi/2)} + l_4 e^{i\theta_2} + d^5 e^{i\theta_5} - l_6 e^{i(\theta_5 - \pi/2)} - l_7 e^{i\theta_7}. \quad (47)$$

To remove $d_5$ from this equation it is convenient to first introduce the variable $d_h$. As shown in FIG. 10, $d_h$ represents the distance from the bail pin to the outer quadrant of the hoist sheave when the hoist rope hangs vertically (ie. $\theta_5 = 90$ deg.). It is related to the angular displacement of the hoist motor by, $$d_h = \frac{\theta_h}{G_h}, \quad (48)$$

where $G_h$, is the hoist transmission ratio. The above expression and Equation 45 can be used to relate $d_5$ and $d_h$, $$d_5 = d_h + l_6 \theta_6 = \frac{\theta_h}{G_h} + l_6 \left(\theta_5 - \frac{\pi}{2}\right). \quad (49)$$

The last term on the right hand side of Eqn. 49 accounts for the angle of wrap of the hoist rope around the sheave. Substituting Eqn. 49 into Eqn. 47 gives $$\zeta(\theta, \psi, \theta_5) = l_1 e^{i\phi_1} + l_2 e^{i\theta_2} + d_3 e^{i(\theta_2 - \pi/2)} + \quad (50)$$

$$l_4 e^{i\theta_2} + \left[\frac{\theta_h}{G_h} + l_6\left(\theta_5 - \frac{\pi}{2}\right)\right] e^{i\theta_5} - l_6 e^{i(\theta_5 - \frac{\pi}{2})} - l_7 e^{i\theta_7} = 0.$$

Taking the real and imaginary components of Eqn. 50 relates $\theta_h$ and $\theta_5$ to the generalized coordinates, $$\gamma_2(\theta, \psi, \theta_5) = \begin{bmatrix} l_1 \cos\phi_1 + l_2 \cos\theta_2 + d_3 \sin\theta_2 + l_4 \cos\theta_2 + \left[\frac{\theta_h}{G_h} + l_6\left(\theta_5 - \frac{\pi}{2}\right)\right]\cos\theta_5 - l_6 \sin\theta_5 - l_7 \cos\phi_7 \quad (51) \\ l_1 \sin\phi_1 + l_2 \sin\theta_2 - d_3 \cos\theta_2 + l_4 \sin\theta_2 + \left[\frac{\theta_h}{G_h} + l_6\left(\theta_5 - \frac{\pi}{2}\right)\right]\sin\theta_5 + l_6 \cos\theta_5 - l_7 \sin\phi_7 \quad (52) \end{bmatrix}. \quad (53)$$

Note that use has been made of the following trigonometric relationships in arriving at Eqn. 51, $$\cos\left(\theta_i - \frac{\pi}{2}\right) = \sin\theta_i, \quad \sin\left(\theta_i - \frac{\pi}{2}\right) = -\cos\theta_i.$$

Concatenating Eqns. 42 and 51 gives $$0 = \Gamma(\theta, \psi, \theta_5) \quad (57)$$

$$= \begin{bmatrix} G_s \theta_1 - \theta_s & (54) \\ G_c d_3 - \theta_c & (55) \\ l_1 \cos\phi_1 + l_2 \cos\theta_2 + d_3 \sin\theta_2 + l_4 \cos\theta_2 + \left[\frac{\theta_h}{G_h} + l_6\left(\theta_5 - \frac{\pi}{2}\right)\right]\cos\theta_5 - l_6 \sin\theta_5 - l_7 \cos\phi_7 & (56) \\ l_1 \sin\phi_1 + l_2 \sin\theta_2 - d_3 \cos\theta_2 + l_4 \sin\theta_2 + \left[\frac{\theta_h}{G_h} + l_6\left(\theta_5 - \frac{\pi}{2}\right)\right]\sin\theta_5 + l_6 \cos\theta_5 - l_7 \sin\phi_7 & \end{bmatrix}$$

All valid configurations must satisfy this Eqns. 54. In particular it forms the basis for the solving the kinematics, the statics, and the dynamics of P&H-class mining shovels.

Kinematic Tracking by Newton-Raphson

The kinematic tracking problem is to determine the values of $\theta$ and $\theta_5$ given $\psi$ or to determine $\psi$ and $\theta_5$ given $\theta$. We call the first problem forward kinematic tracking and the second inverse kinematic tracking. For notational convenience in distinguishing between these two problems, we write $$\theta_F = (\theta_1, \theta_2, \theta_3, \theta_5)$$

$$\psi_F = (\theta_s, \theta_c, \theta_h)$$

when working in the domain of the forward kinematic tracking problem and $$\theta_I = (\theta_1, \theta_2, \theta_3)$$

$$\psi_I = (\theta_s, \theta_c, \theta_h, \theta_5)$$

The difference here is in with the grouping of $\theta_5$. Both problems amount mathematically to solving the non-linear constraint equations. We chose to do this iteratively using a multi-variable Newton's method. The Jacobian matrices developed in expressing a Newton's method solution are used to refer motor inertias to the configuration variables and to solve the statics problem.

Forward Kinematic Tracking

Applying Taylor's series expansion to Eqn 54

$$\Gamma(\theta_F + \Delta\theta_F, \psi_F + \Delta\psi_F) =$$
$$\Gamma(\theta_F, \psi_F) + \frac{\delta\Gamma(\theta_F, \psi_F)}{\delta\theta_F}\Delta\theta_F + \frac{\delta\Gamma(\theta_F, \psi_F)}{\delta\psi_F}\Delta\psi_F + HOT = 0.$$

The objective is to find a valid configuration, i.e. $\Gamma(\theta_F+\Delta\theta_F, \psi_F+\Delta\psi_F)=0$. It follows that $$\Gamma(\theta_F, \psi_F) \approx -\left[\frac{\delta\Gamma(\theta_F, \psi_F)}{\delta\theta_F}\Delta\theta_F + \frac{\delta\Gamma(\theta_F, \psi_F)}{\delta\psi_F}\Delta\psi_F\right] \quad (58)$$

Equation 58 leads to the iteration equation $$\Delta\theta_F^k = -\left(\frac{\partial\Gamma(\theta_F^{k-1}, \psi_F^k)}{\partial\theta_F}\right)^{-1}\left(\Gamma(\theta_F^{k-1}, \psi_F^k) + \frac{\partial\Gamma(\theta_F^{k-1}, \psi_F^k)}{\partial\psi_F}\Delta\psi_F^k\right) \quad (59)$$

with $$\theta_F^k = \theta_F^{k-1} + \Delta\theta_F^k \quad (60)$$

The algorithm below, gives an algorithm for kinematic tracking for P&H-class shovels. The algorithm takes the current motor positions, $\psi_F^k$ and uses Eqns. 59 and 60 to find the new values of $\theta_F^k$ consistent with the constraint equations. For reliable convergence the algorithm requires a good initial values $\theta_F^0$. In practice this can be achieved by initializing from a well defined configuration such as provided in FIG. 10 where the forward kinematics can be explicitly solved using trigonometry. We note the bail-pin position can be easily found from 0 using Eqn. 39.

Algorithm 3: Forward Kinematic Tracking Using Newton's Method input: Current motor position $\psi_F^k$.
output: Values of configuration variables $\theta_F^k$ consistent with the constraint equations.
priors: Previous motor and configuration variables: $\theta_F^{k-1}$, $\psi_F^{k-1}$.

Initialization:

$$\Delta\psi_F^k = \psi_F^k - \psi_F^{k-1}$$

$$\theta_F^k = \theta_F^{k-1}$$

$$\gamma_F = \Gamma(\theta_F^k, \omega_F^k)$$

Iterate Until Converged:

$$\|\Gamma_F\| < tol \quad \Delta\theta_F^k = -\left(\Gamma(\theta_F^k, \psi_F^k) + \frac{\partial\Gamma(\theta_F^k, \psi_F^k)}{\partial\psi_F}\Delta\psi_F^k\right)$$

$$\theta_F^k = \theta_F^k + \Delta\theta_F^k$$

$$\Gamma_F = \Gamma(\theta_F^k, \psi_F^k)$$

It is possible to write the Jacobian matrices, $$\frac{\partial\Gamma}{\partial\theta_f} = \begin{pmatrix} G_s & 0 & 0 & 0 \\ 0 & 0 & G_c & 0 \\ 0 & -(l_2+l_4)\sin\theta_2 + d_3\cos\theta_2 & \sin\theta_2 & -\sin\theta_5\left[\frac{\theta_h}{G_h} + l_6\left(\theta_5 - \frac{\pi}{2}\right)\right] \\ 0 & (l_2+l_4)\cos\theta_2 + d_3\sin\theta_2 & -\cos\theta_2 & \cos\theta_5\left[\frac{\theta_h}{G_h} + l_6\left(\theta_5 - \frac{\pi}{2}\right)\right] \end{pmatrix} \quad (61)$$

$$\frac{\partial\Gamma}{\partial\psi_F} = \begin{pmatrix} -1 & 0 & 0 \\ 0 & -1 & 0 \\ 0 & 0 & \frac{\cos\theta_5}{G_h} \\ 0 & 0 & \frac{\sin\theta_5}{G_h} \end{pmatrix} \quad (62)$$

Let $$J_F = \left(\frac{\partial \Gamma}{\partial \theta_F}\right)^{-1} \frac{\partial \Gamma}{\partial \psi_F}.$$

Evaluating expression symbolically we have $$J_F = \begin{pmatrix} \frac{1}{G_s} & 0 & 0 \\ 0 & \frac{\sin(\theta_5 - \theta_2)}{G_c \gamma_1} & -\frac{1}{G_h \gamma_1} \\ 0 & \frac{1}{G_c} & 0 \\ 0 & \frac{G_h d_3}{G_c \gamma_1 \gamma_2} & \frac{(l_2 + l_4)\cos(\theta_5 - \theta_2) - d_3 \sin(\theta_5 - \theta_2)}{\gamma_1 \gamma_2} \end{pmatrix} \quad (63)$$

with $$\gamma_1 = d_3 \cos(\theta_5 - \theta_2) + (l_2 + l_4)\sin(\theta_5 - \theta_2) \quad (64)$$
$$\gamma_2 = \theta_h + G_h l_6 \left(\theta_5 - \frac{\pi}{2}\right)$$

Note this matrix relates motor speeds to the speeds of the configuration variables.

Inverse Kinematic Tracking

The same arguments that gave rise to Eqn. 59 and 60 can be used to form an iteration equation for inverse kinematic tracking, namely $$\Delta \psi_I^k = -\left(\frac{\partial \Gamma(\theta_I^k, \psi_I^{k-1})}{\partial \psi_I}\right)^{-1} \left(\Gamma(\theta_I^k, \psi_I^{k-1}) + \frac{\partial \Gamma(\theta_I^k, \psi_I^{k-1})}{\partial \theta_I} \Delta \theta_I^k\right), \quad (65)$$

where $$\psi_I^k = \psi_I^{k-1} + \Delta \psi_I^k \quad (66)$$

Symbolic forms for $$\frac{\partial \Gamma}{\partial \psi_I}, \frac{\partial \Gamma}{\partial \theta_I},$$

and the product $$J_I = \left(\frac{\partial \Gamma}{\partial \psi_I}\right)^{-1} \frac{\partial \Gamma}{\partial \theta_I}$$

are given as Eqns. 69.

Algorithm 4: Inverse kinematic tracking using Newton's method
  input: Current configuration variables $\theta_i^k$.
  output: Current motor position $\psi_I^k$.
  priors: Previous motor and configuration variables: $\theta_i^{k-1}$, $\psi_i^{k-1}$.
Initialization:

$$\Delta \theta_I^k = \theta_I^k - \theta_I^{k-1}$$

$$\psi_I^k = \psi_I^{k-1}$$

$$\Gamma_I = \gamma(\theta_I^k, \psi_I^k)$$

Iterate Until Converged:

$$\|\Gamma_I\| < tol \quad \Delta \psi_I^k = -\left(\frac{\partial \Gamma(\theta_I^k, \psi_I^k)}{\partial \psi_I}\right)^{-1} \left(\Gamma(\theta_I^k, \psi_I^k) + \frac{\partial \Gamma(\theta_I^k, \psi_I^k)}{\partial \theta_I} \Delta \theta_I^k\right)$$

$$\psi_I^k = \psi_I^k + \Delta \psi_I^k$$

$$\Gamma_I = \Gamma(\theta_I^k, \psi_I^k)$$

$$\frac{\partial \Gamma}{\partial \psi_i} = \begin{pmatrix} -1 & 0 & 0 & 0 \\ 0 & -1 & 0 & 0 \\ 0 & 0 & \frac{\cos \theta_5}{G_h} & -\sin \theta_5 \left[\frac{\theta_h}{G_h} + l_6\left(\theta_5 - \frac{\pi}{2}\right)\right] \\ 0 & 0 & \frac{\sin \theta_5}{G_h} & \cos \theta_5 \left[\frac{\theta_h}{G_h} + l_6\left(\theta_5 - \frac{\pi}{2}\right)\right] \end{pmatrix}, \quad (67)$$

$$\frac{\partial \Gamma}{\partial \theta_I} = \begin{pmatrix} G_s & 0 & 0 \\ 0 & 0 & G_c \\ 0 & -(l_2 + l_4)\sin \theta_2 + d_3 \cos \theta_2 & \sin \theta_2 \\ 0 & (l_2 + l_4)\cos \theta_2 + d_3 \sin \theta_2 & -\cos \theta_2 \end{pmatrix}, \quad (68)$$

$$J_I = \begin{pmatrix} G_s & 0 & 0 \\ 0 & 0 & G_c \\ 0 & -G_h[(l_2 + l_4)\sin(\theta_5 - \theta_2) + d_3 \cos(\theta_5 - \theta_2)] & G_h \sin(\theta_5 - \theta_2) \\ 0 & \dfrac{G_h[d_3 \sin(\theta_5 - \theta_2) - (l_2 + l_4)\cos(\theta_5 - \theta_2)]}{\theta_h + l_6 G_h(\theta_5 - \pi/2)} & \dfrac{G_h \cos(\theta_5 - \theta_2)}{\theta_h + l_6 G_h(\theta_5 - \pi/2)} \end{pmatrix}. \quad (69)$$

Rigid Body Dynamics of P&H-Class Electric Mining Shovels

The preferred embodiment therefore provides a framework for payload estimation on electric mining shovels, is implemented as a bank of Kalman filters running in parallel and estimating shovel state. Each model hypothesizes a value for the payload mass (and possibly other parameters) though a process model, and the probability of each hypothesis being true is evaluated using the statistical properties of the filter residuals. The "true" payload is computed by taking the expected value of the discrete distribution defined by the filter models.

There is a body of received wisdom, well established in the literature, that argues that a process model should be parsimonious—as simple as possible but not simpler—to minimize overall model error. Given the available measurement set, the preferred embodiment uses a process model that models only those dynamics states associated with the rigid body dynamics of the machine. Lagrangian methods are employed to derive the equations of motion describing these rigid body dynamics and develop a framework for computing the linearization of the rigid body dynamics about an arbitrary state trajectory needed for implementation of the extended Kalman filter.

Structure of Process Model

Since the purpose of the process model in the context of payload estimation is to factor out the effect of machine dynamics, it is desirable to measure the states of the model and the inputs directly and accurately. Intuitively, this results in minimal dispersion of information across unmeasured states. A Kalman filter running the correct payload hypothesis should produce state estimates that have greater accuracy than the sensors can measure them. And intuitively, this, in turn, should lead to better payload estimate.

The principle of measuring (rather than estimating) as many of the process model states as possible, argues for two process models: (i) a model comprising the electrical dynamics of the motors and rigid body dynamics of the machine house, saddle, and handle-dipper with the armature voltages serving as inputs, the armature currents and positions serving as measurements, and motor velocities estimated within the Kalman filter structure; or (ii) a model comprising only the rigid body dynamics of the machine house, saddle, and handle-dipper with motor currents serving as inputs and measurements being motor positions and armature voltages. The possible third option of a process model comprising the controller dynamics, the electrical dynamics, and rigid body dynamics is ruled out on the grounds that its more complicated than the two models identified above and requires access to the internal states of the PI and PID controllers, which in practice, are not easily measured.

The second model is chosen because it has fewer states (parsimony) and because the armature voltage and current can be used to obtain an estimate of motor velocity from Eqn. 70. This, of course, is also true for the for Model (i), however the motor dynamics would then be repeated in both the process model and the measurement equations to no apparent advantage.

Given this model there is the decision of which variables to use as states. The obvious candidates with the motor positions and velocities or the configuration variables $\theta$ and their derivatives $\dot{\theta}$. These variables are kinematically linked via the constraint equations. The choice dictates to what generalized variables the inertias, motions, and forces are all referred. It transpires that the expressions are simpler if we choose the configuration variables and their velocities as states.

Rigid Body Dynamics

The kinematic model represented the shovel as three rigid bodies connected in series. These bodies were (i) machine house and boom, (ii) saddle, and (iii) the dipper and handle. Each body is driven by a motor having its own inertial properties through a transmission. The coupling between the bodies and the motors is assumed to be rigid. The three mass system will be expressed with respect to the configuration coordinates $\theta$ and their derivatives as defined previously.

A Lagrangian formulation can be used in conjunction with a screw theoretic description of the kinematic geometry of the shovel to give a high level, description of the dynamics. Lagrange's equations are founded on the principles of virtual work.

The task of deriving the equations describing the rigid body dynamics is complicated by the coupling that exists between the crowd and hoist drives that sees both act directly on the handle-dipper assembly. The constraint equations, derived in above take the form of an implicit relationship between configuration variables and motor position (i.e. $\gamma(\theta_i,\psi_I,\theta_I))=0$). Usually for constrained systems, where the dependent variables cannot be eliminated, a Lagrangian multiplier approach is used to develop the equations of motion. When that approach is applied to this problem, the resulting expressions are not in a form that can be readily applied within a Kalman filtering framework. To overcome this difficulty the equations of motion are developed here using embedded constraint equations. This treatment leads to an unaltered form of the Kalman filtering equations.

Lagrange's equations can be written $$\frac{d}{dt}\left(\frac{\partial L}{\partial \dot{\theta}_i}\right) - \frac{\partial L}{\partial \theta_i} = \tau_i, \tag{71}$$

The Lagrangian function (or Lagrangian for short) is given by L=T−V, with T the total kinetic energy, V the total potential energy of the system, and $\tau_i$ is the generalized force in the direction of the generalized coordinate $\theta_i$. For this problem, the potential energy of the system is independent of velocity. Thus Eqn. 71 can be written as, $$\frac{d}{dt}\left(\frac{\partial T}{\partial \dot{\theta}_i}\right) - \frac{\partial T}{\partial \theta_i} = \tau_i + \gamma_i, \tag{72}$$

where, $$\gamma_i = \frac{\partial V}{\partial \theta_i}. \tag{73}$$

The total kinetic is equal to the sum of the kinetic energy of the rigid bodies comprising the front-end and the kinetic energy of the motor and transmission inertias.

$$T = \frac{1}{2}(\dot{\theta}_I^T \bar{A} \dot{\theta}_I + \dot{\psi}_I^T \tilde{A} \dot{\psi}_I). \tag{74}$$

In the above equation $\bar{A}$ is a 3×3 matrix describing the inertial properties of the machine house and boom, the saddle, and the handle and dipper assembly referred to the configuration coordinates $\theta$. We refer to the kinetic energy associated with this inertia, the external body kinetic energy because it corresponds to the kinetic energy the external bodies of the machine.

The matrix $\tilde{A}$ is a 4×4 matrix describing the inertias of the motor rotors and transmission elements referred to the dependent variables $\psi$. We refer to the component of kinetic energy associated with this inertia, the internal kinetic energy.

External Kinetic Energy

The external kinetic energy aggregates energy associate with the mechanical dynamics of the house, boom, saddle, handle, dipper, bail pin, hoist rope, and the swing, crowd and hoist drives. For the development of the equations the house and boom, the saddle, and handle dipper and treated as three rigid bodies. To reduce the complexity of the dynamics, consistent with the principle of parsimony, the following assumptions were made:

1. The hoist rope is inextensible,
2. The hoist rope is massless,

No assumptions are made in the formulation about the direction of the gravity vector in the $O_0x_0y_0z_0$ frame, although in the absence of inclinometer information, gravity is taken as aligning with the $z_0$ axis.

To form an expression for the external kinetic energy, a screw theoretic formulation is used. The formulation is based in the observation that the canonical description of an infinitesimal rigid body motion corresponds to a rotation about a defined spatial line together with a translation along that line. That is, the most general instantaneous motion of a rigid body is a spatial twisting. If the motion corresponds, instantaneously, to a translation the line about which the body twists (screw axis) is in the plane at infinity. For all other motions, the corresponding screw axes are lines in affine space. Twisting motions can be concisely described by a 6-dimensional vector of Plücker coordinate, describing the translational and rotational velocities $$\dot{q} = \begin{pmatrix} \omega \\ v \end{pmatrix}, \tag{75}$$

where $$\omega = (\omega_x, \omega_y, \omega_z)^T,$$
$$v = (v_x, v_y, v_z)^T,$$

are, respectively, the rotational velocity and the translational velocity of the body in the same frame of reference? The angular velocity, $\omega$ is a free vector and the translational velocity, $v$, can be interpreted as the velocity of the (possibly fictitious) point of the body instantaneously at the origin of the frame of reference.

In machines, the relative motion of bodies is commonly constrained by physical joints that allow one degree of relative freedom. The Plücker coordinates describing the relative motion can be written $$\dot{q}_i = \dot{\theta}_i s_i$$

where $\theta_i$ is the relative speed of the joint and $s_i$ is the normalized Plücker coordinates for the motion known as the joint screw. The convention is to normalize $\dot{q}_i$ by dividing each element by the magnitude of the angular speed $\omega$ for rotational and helical motions and by magnitude of $v$ for translational motions. In this way the joint screws serve as a basis for describing the instantaneous motion of a linkage. Relative velocities add in the usual way provided all motions are expressed in the same frame of reference.

For example, the velocities of the three external bodies of an EMS are $$\dot{q}_1 = \dot{\theta}_1 s_1$$

$$\dot{q}_2 = \dot{\theta}_1 s_1 + \dot{\theta}_2 s_2$$

$$\dot{q}_3 = \dot{\theta}_1 s_1 + \dot{\theta}_2 s_2 + \dot{d}_3 s_3 \tag{76}$$

where $\dot{\theta}_1$, $\dot{\theta}_2$, and $\dot{d}_3$ are the velocities of the configuration variables and $s_1$, $s_2$, $s_3$ are the joint screws in for the three freedoms in the $O_0 x_0 y_0 z_0$-frame whose Plücker coordinates are $$s_1 = (0,0,1;0,0,0)^T$$

$$s_2 = (\sin\theta_1, -\cos\theta_1, 0; l_1 \sin\phi_1 \cos\theta_1, l_1 \sin\phi_1 \sin\theta_1, -l_1 \cos\phi_1)^T \tag{77}$$

$$s_3 = (0,0,0; \cos\theta_1 \sin\theta_2, \sin\theta_1 \sin\theta_2, \cos\theta_2)^T \tag{77}$$

The kinetic energy of a rigid body instantaneously twisting with the Plücker vector expressed in an inertial frame is given by $$T = \frac{1}{2} \begin{pmatrix} \omega & v \end{pmatrix} \begin{pmatrix} J & mC \\ mC^T & mI_3 \end{pmatrix} \begin{pmatrix} \omega \\ v \end{pmatrix} \tag{78}$$

where m is the mass of the body, J is the 3×3 rotational inertia matrix of the body in the inertial reference frame $$J = \begin{pmatrix} I_{xx} & I_{xy} & I_{xz} \\ I_{xy} & I_{yy} & I_{yz} \\ I_{xz} & I_{yz} & I_{zz} \end{pmatrix}, \tag{79}$$

and C is the skew-symmetric form of the centre-of-mass vector of the body, $c = (c_x, c_y, c_z)^T$, in the inertial frame and $$C = \begin{pmatrix} 0 & -c_z & c_y \\ c_z & 0 & -c_x \\ -c_y & c_x & 0 \end{pmatrix}. \tag{80}$$

Note the skew-symmetric form of c takes the cross product with a 3-vector that post multiplies it.

Equation 78 can be written in shorthand notation $$T = \frac{1}{2} \dot{q}_b^T N^b \dot{q}_b \tag{81}$$

where the 6×6 matrix $N^b$ known as the inertia matrix. Inertia matrices are most easily expressed in a body fixed frame b. The transformation of an inertia from a (possibly moving) body-fixed frame to another frame, e.g. an inertial frame can be achieved using $$N^0 = H_{0 \to b}^{T} N^b H_{0 \to b}^{-1}. \tag{82}$$

where $H_{0 \to b}$ is a 6×6 screw transformation matrix having structure.

$$H_{0 \to b} = \begin{pmatrix} R_{0 \to b} & 0(19) \\ T_{0 \to b} R_{0 \to b} & R_{0 \to b}(20) \end{pmatrix} \tag{85}$$

The matrix $R_{0 \to b}$ is a 3×3 rotation matrix and T is the skew symmetric form of the translation vector $t_{0 \to b}$. From Eqns. 76 and 81 is hence given by $$T = \frac{1}{2} (\dot{q}_1^T N_1^0 \dot{q}_1 + \dot{q}_2^T N_2^0 \dot{q}_2 + \dot{q}_3^T N_3^0 \dot{q}_3)$$

$$= \sum_{i=1}^{3} \sum_{j=i}^{3} \dot{\theta}_i s_i^T \left( \sum_{k=j}^{3} N_k^0 \right) s_j \dot{\theta}_j$$

where for notational convenience $\dot{\theta}_3$ has been substituted for $\dot{d}_3$. When written in terms of the derivatives of the configuration variables, $\theta$ by $$T = \frac{1}{2}\dot{\theta}_I^T \overline{A} \dot{\theta}_I \quad (86)$$

where $$\overline{a}_{ij} = s_i^T \left(\sum_{k=l}^{3} N_k^0\right) s_j,$$

with l=max(i,j). This expression is in a form amenable to expansion via a symbolic manipulation package. The requirements (i) are values for the inertias in body fixed frames of reference; (ii) transformations of the form of Eqn. 81 which, for a P&H-class mining shovel; and (iii) the joint screws which are given by Eqns. 77.

Internal Kinetic Energy

The internal kinetic energy is given by $$T_i = \frac{1}{2}\dot{\psi}_I^T \tilde{A} \dot{\psi}_I, \quad (87)$$

where $$\tilde{A} = \begin{pmatrix} J_s & 0 & 0 & 0 \\ 0 & J_c & 0 & 0 \\ 0 & 0 & J_h & 0 \\ 0 & 0 & 0 & 0 \end{pmatrix}.$$

Here $J_s$ is the inertia of the swing armature and swing transmission referred to the rotor axis; $J_c$ is the inertia of the crowd armature and transmission referred to the rotor axis; and $J_h$ the inertia of the hoist armature and transmission referred to the rotor axis. We desire to express this energy in the configuration variables θ.

The derivative of the constraint equation, with respect to time is $$0 = \frac{d\Gamma(\theta_I, \psi_I)}{dt},$$

$$= \frac{\partial \Gamma(\theta_I, \psi_I)}{\partial \psi_I}\frac{d\psi_I}{dt} + \frac{\partial \Gamma(\theta_I, \psi_I)}{\partial \theta_I}\frac{d\theta_I}{dt},$$

$$= \frac{\partial \Gamma(\theta_I, \psi_I)}{\partial \psi_I}\dot{\psi}_I + \frac{\partial \Gamma(\theta_I, \psi_I)}{\partial \theta_I}\dot{\theta}_I.$$

In the above equation $$\frac{d\Gamma(\theta_I, \psi_I)}{d\psi_I}$$

is the 4×4 matrix and $$\frac{d\Gamma(\theta_I, \psi_I)}{d\theta_I}$$

is a 4×3 matrix. Provided $$\frac{d\Gamma(\theta_I, \psi_I)}{d\psi_I}$$

has full rank, the above expression can be arranged as $$\dot{\psi}_I = -\left(\frac{d\Gamma(\theta_I, \psi_I)}{d\psi_I}\right)^{-1} \frac{d\Gamma(\theta_I, \psi_I)}{d\theta_I}\dot{\theta}_I, \quad (88)$$

$$= J_i(\theta_I, \psi_I)\dot{\theta}_I,$$

where $$J_i(\theta_I, \psi_I) = -\left(\frac{d\Gamma(\theta_I, \psi_I)}{d\psi_I}\right)^{-1} \frac{d\Gamma(\theta_I, \psi_I)}{d\theta_I}$$

We call $J_I(\theta_I,\psi_I)$ the constraint Jacobian. It relates the velocities of the configuration variables to those of the dependent variables.

The internal kinetic energy expressed in the configuration variables is therefore $$T_i = \dot{\theta}_I^T J_I(\theta,\psi)^T \tilde{A} J_I(\theta_I,\omega_I) \dot{\theta}_I. \quad (89)$$

Again the expression is in a form that readily facilitates symbolic evaluation. The total kinetic energy is $$T = \frac{1}{2}\left[\dot{\theta}_I^T \overline{A}\dot{\theta}_I + \dot{\theta}_I^T J_I(\theta_I, \psi_I)^T \tilde{A} J_I(\theta_I, \psi_I)\dot{\theta}_I\right] = \frac{1}{2}\dot{\theta}_I^T A \dot{\theta}_I, \quad (90)$$

where $$A = \overline{A} + J_I(\theta, \psi)^T \tilde{A} J_I(\theta, \psi).$$

In summation notation we can write Eqn. 90, $$T = \frac{1}{2}\sum_{i=1}^{3}\sum_{j=1}^{3} a_{ij}\dot{\theta}_i\dot{\theta}_j. \quad (91)$$

The inertia terms $a_{ij}$ are functions of both the dependent and independent coordinates due to the introduction of $J_I(Q_I,\omega_I)$, but are not explicitly dependent on time. To simplify the notation, the dependence of $J_I(\theta_I,\omega_I)$ on $\theta_I$ and $\psi_I$ will no longer be shown.

Evaluation of Lagrange's Equation

It is necessary to evaluate the derivatives on the left hand side of the Lagrange's equation. As the kinetic and potential energy are independent we shall evaluate their contribution to the Lagrange's equations separately.

Using Eqn. 91, the first term on the left hand side of Eqn. 72 becomes, $$\frac{d}{dt}\left(\frac{\partial T}{\partial \dot{\theta}_i}\right) = \frac{d}{dt}\left[\frac{\partial}{\partial \dot{\theta}_i}\left(\frac{1}{2}\sum_{i=1}^{3}\sum_{j=1}^{3} a_{ij}\dot{\theta}_i\dot{\theta}_j\right)\right], \quad (92)$$

$$= \frac{d}{dt}\left(\sum_{j=1}^{3} a_{ij}\dot{\theta}_j\right),$$

$$= \sum_{j=1}^{3}\left(\frac{da_{ij}}{dt}\dot{\theta}_j + a_{ij}\ddot{\theta}_j\right).$$

Using the chain rule, the derivative of $a_{ij}$ with respect to time is $$\frac{da_{ij}}{dt} = \frac{\partial a_{ij}}{\partial \psi}\frac{d\psi}{dt} + \frac{\partial a_{ij}}{\partial \theta}\frac{d\theta}{dt},$$

$$= \frac{\partial a_{ij}}{\partial \psi}\dot\psi + \frac{\partial a_{ij}}{\partial \theta}\dot\theta.$$

Using Eqn. 88 we can remove $\dot\psi$ from the above expression, $$\frac{da_{ij}}{dt} = \left(\frac{\partial a_{ij}}{\partial \psi}J_I + \frac{\partial a_{ij}}{\partial \theta}\right)\dot\theta. \tag{93}$$

Alternatively we can write, $$\frac{da_{ij}}{dt} = \sum_{k=1}^{3}\left(\sum_{l=1}^{4}\frac{\partial a_{ij}}{\partial \psi_l}J_{I,lk} + \frac{\partial a_{ij}}{\partial \theta_k}\right)\dot\theta_k. \tag{94}$$

Here $J_{I,lk}$ is the (l,k)-th element of $J_I$. This allows Eqn. 92 to be expressed as $$\frac{d}{dt}\left(\frac{\partial T}{\partial \dot\theta_i}\right) = \sum_{j=1}^{3}\left(\frac{da_{ij}}{dt}\dot\theta_j + a_{ij}\ddot\theta_j\right), \tag{95}$$

$$= \sum_{j=1}^{3}\left[\sum_{k=1}^{3}\left(\sum_{l=1}^{4}\frac{\partial a_{ij}}{\partial \psi_l}J_{I,lk} + \frac{\partial a_{ij}}{\partial \theta_k}\right)\dot\theta_j\dot\theta_k + a_{ij}\ddot\theta_j\right].$$

Considering now the second term on the left hand side of Lagrange's equations, we have $$\frac{\partial T}{\partial \theta_i} = \frac{\partial}{\partial \theta_i}\left(\frac{1}{2}\sum_{j=1}^{3}\sum_{k=1}^{3}a_{jk}\dot\theta_j\dot\theta_k\right), \tag{96}$$

$$= \frac{1}{2}\sum_{j=1}^{3}\sum_{k=1}^{3}\frac{\partial a_{jk}}{\partial \theta_i}\dot\theta_j\dot\theta_k.$$

Applying the chain rule to the partial differential term in this equation gives $$\frac{\partial a_{jk}}{\partial \theta_i} = \frac{\partial a_{jk}}{\partial \psi}\frac{\partial \psi}{\partial \theta}\frac{\partial \theta}{\partial \theta_i} + \frac{\partial a_{jk}}{\partial \theta}\frac{\partial \theta}{\partial \theta_i}.$$

The time derivative of the dependent variables, $\dot\psi$, can be written $$\dot\psi = \frac{\partial \psi}{\partial \theta}\dot\theta. \tag{97}$$

Equating the above expression with Equation 24 gives $$\frac{\partial \psi}{\partial \theta} = J_I. \tag{98}$$

Then using Eqn. 98 to eliminate $$\frac{\partial \psi}{\partial \theta}$$

from Eqn. 97 gives $$\frac{\partial a_{jk}}{\partial \theta_i} = \frac{\partial a_{jk}}{\partial \psi}J_I\frac{\partial \theta}{\partial \theta_i} + \frac{\partial a_{jk}}{\partial \theta}\frac{\partial \theta}{\partial \theta_i}, \tag{99}$$

$$= \left(\frac{\partial a_{jk}}{\partial \psi}J_I + \frac{\partial a_{jk}}{\partial \theta}\right)\frac{\partial \theta}{\partial \theta_i}.$$

As the generalized coordinates are independent, it follows that $$\frac{\partial \theta}{\partial \theta_i} = \begin{cases} 1 & i = j \\ 0 & i \neq j. \end{cases} \tag{100}$$

Applying this expression Eqn. 99 becomes, $$\frac{\partial a_{jk}}{\partial \theta_i} = \sum_{l=1}^{4}\frac{\partial a_{jk}}{\partial \psi_l}J_{I,li} + \frac{\partial a_{jk}}{\partial \theta_i},$$

allowing Eqn. 96 can be written $$\frac{\partial T}{\partial \theta_i} = \frac{1}{2}\sum_{j=1}^{3}\sum_{k=1}^{3}\left(\sum_{l=1}^{4}\frac{\partial a_{jk}}{\partial \psi_l}J_{I,li} + \frac{\partial a_{jk}}{\partial \theta_i}\right)\dot\theta_j\dot\theta_k. \tag{101}$$

Using Eqn.s 95 and 101 the contribution of the kinetic energy terms to Lagrange's equations becomes, $$\frac{d}{dt}\left(\frac{\partial T}{\partial \dot\theta_i}\right) - \frac{\partial T}{\partial \theta_i} = \sum_{j=1}^{3}a_{ij}\ddot\theta_j + \sum_{j=1}^{3}\sum_{k=1}^{3} \tag{102}$$

$$\left[\sum_{l=1}^{4}\left(\frac{\partial a_{ij}}{\partial \psi_l}J_{I,lk} - \frac{1}{2}\frac{\partial a_{jk}}{\partial \psi_l}J_{I,li}\right) + \frac{\partial a_{ij}}{\partial \theta_k} - \frac{1}{2}\frac{\partial a_{jk}}{\partial \theta_i}\right]\dot\theta_j\dot\theta_k,$$

$$= \sum_{j=1}^{3}a_{ij}\ddot\theta_j + \sum_{j=1}^{3}\sum_{k=1}^{3}b_{ijk}\dot\theta_j\dot\theta_k,$$

where $$b_{ijk} = \sum_{l=1}^{4}\left(\frac{\partial a_{ij}}{\partial \psi_l}J_{I,lk} - \frac{1}{2}\frac{\partial a_{jk}}{\partial \psi_l}J_{I,li}\right) + \frac{\partial a_{ij}}{\partial \theta_k} - \frac{1}{2}\frac{\partial a_{jk}}{\partial \theta_i}. \tag{103}$$

Gravity Induced Generalized Forces

A screw theoretic approach can also be used to describe the combined action of forces and moments that act on a body. More specifically, any system of forces acting on a body can be reduced to a force acting along a unique line in space together with a moment acting about that line. This couplet of a force F and a moment C is known as a wrench and takes the form of a six dimensional vector $$W=(C;F)^T$$

Just as screws provide a canonical description of infinitesimal rigid body motions, wrenches provide a canonical description of the net force acting on a body.

Gravity imposes a wrench loading on each body shovel model. Suppose N is the inertia matrix for a rigid body expressed in an inertial frame. The wrench acting on this body due to gravity is given by $$G=Ng \qquad (104)$$

where g is the six-dimensional vector describing gravitational acceleration. In FIG. 9, the z-axis of the inertial frame is aligned with the direction of gravitational acceleration. Here $$g=(0,0,0;0,0,g)^T \qquad (105)$$

with $g=-9.81$ m/s$^2$.

Suppose the body is constrained to motion about a joint screw s and let the angle of rotation $\theta$ of the body about that screw axis be the generalized coordinate for the body. The component of the generalized force due to gravitational loading, $\tau_g$ can be found from the inner product of the gravitational wrench and the joint screw, i.e.

$$\tau_g = Ws$$

The gravitational wrenches acting on each of the rigid bodies of the shovel model are $$G_1^0 = (N_1^0 + N_2^0 + N_3^0)g$$

$$G_2^0 = (N_1^0 + N_2^0)g$$

$$G_3^0 = N_3^0 g$$

or in general $$G_i^0 = \sum_{j=1}^{3} N_i^0 g$$

The refer $G_i$ to the generalized coordinates, we pair each gravitational wrench with the joint screw, i.e.

$$\gamma_i = G_i^T s_i. \qquad (106)$$

If the shovel is inclined so that the unit vector $n=(n_x, n_y, n_z)$ defines the direction of gravity in the $O_0 x_0 y_0 z_0$-frame, $$g=(0,0,0;gn_x,gn_y,gn_z)^T \qquad (107)$$

The remainder of the formulation remains the same. In a practical implementation, the direction cosines n could be measured by inclinometers. In this instance $\gamma$ is the 3-dimensional vector

Generalized Actuator Forces

Let $\tau$ be the vector of generalized actuator forces, i.e.

$$\tau=(\tau_1,\tau_2,\tau_3) \qquad (109)$$

These generalized forces are generated by net motor torques $$T=(T_s,T_c,T_h,0)^T. \qquad (110)$$

where $T_s$ is the net torque applied by the swing drive, $T_c$ the net torque applied by the crowd drive, and $T_h$ net torque applied by the hoist drives. These torques are the electromagnetic torques dependent on the drives less the losses through the transmissions. These torques act on the dependent coordinates $\psi$. Note the final element of T in Eqn. 110 corresponds to the torque applied on $\theta_5$; this is set to zero as no torque acts in that direction.

It is required to relate T to $\tau$ which can be done using the constraint Jacobian and the principle of virtual work. The rate at which the net motor torques do work is given by the inner product of T with $\dot{\psi}$. Since the constraints, by definition, can do no work, it must follow that $$\dot{\psi}^T T = \dot{\theta}^T \tau$$

Substituting in Eqn. 88 gives the relationship between the net motor torques and the generalized torques, $$\tau = J_I^T T \qquad (111)$$

It therefore follows that:

$$\tau = \begin{pmatrix} G_s T_s \\ (-G_h(l_2+l_4)\sin(\theta_5-\theta_2) - G_h d_3 \cos(\theta_5-\theta_2))T_h \\ G_c T_c + G_h \sin(\theta_5-\theta_2)T_h \end{pmatrix} \qquad (112)$$

The sum of Eqns 108 and 112 equated to zero defined the static equations for a P&H-class mining shovel referred to the generalized coordinates $\theta$.

Damping Losses

We can incorporate viscous damping losses into the equations of motion as follows, in terms of the time derivatives of the dependent variables.

$$T_D = \tilde{D}\dot{\psi}$$

where $\tilde{D}$ represents the damping due to the motors and the damping on the joints. Then $$\beta = -J_I^T T_D = -J_I^T \tilde{D} J_{I=\dot{\theta}D} \qquad (113)$$

where $$D = J_I^T \tilde{D} J_I$$

$$\gamma = \begin{pmatrix} 0 \\ g[(m_p c_{xp} + m_3 c_{x3} - m_2 c_{z2})\sin\theta_2 + (m_2 c_{x2} + m_3 c_{z3} + m_p c_{zp})\cos\theta_2 + (m_3+m_p)d_3\sin\theta_2 + (m_3+m_p)l_2\cos\theta_2] - \\ g(m_3+m_p)\cos\theta_2 \end{pmatrix} \qquad (108)$$

Summary of the Rigid Body Dynamics

In summary, the equations governing rigid body motion of the machine can be written $$\sum_{j=1}^{n} a_{ij} \ddot{\theta}_j + \sum_{j=1}^{n} \sum_{k=1}^{n} b_{ijk} \dot{\theta}_j \dot{\theta}_k = \tau_i + \gamma_i + \beta_i \tag{114}$$

or in matrix form $$A\ddot{\theta} + B\dot{\theta}_{ii} + C\dot{\theta}_{ij} = \tau + \gamma + \beta, \tag{115}$$

where $$A = \begin{pmatrix} a_{11} & a_{12} & a_{13} \\ a_{21} & a_{22} & a_{23} \\ a_{31} & a_{32} & a_{33} \end{pmatrix}, \tag{116}$$

$$B = \begin{pmatrix} b_{111} & b_{122} & b_{133} \\ b_{211} & b_{222} & b_{233} \\ b_{311} & b_{322} & b_{333} \end{pmatrix}, \tag{117}$$

$$C = \begin{pmatrix} b_{112}+b_{121} & b_{113}+b_{131} & b_{123}+b_{132} \\ b_{212}+b_{221} & b_{213}+b_{231} & b_{223}+b_{232} \\ b_{312}+b_{321} & b_{313}+b_{331} & b_{323}+b_{332} \end{pmatrix}, \tag{118}$$

and $$\tau = \begin{pmatrix} \tau_1 \\ \tau_2 \\ \tau_3 \end{pmatrix}, \gamma = \begin{pmatrix} \gamma_1 \\ \gamma_2 \\ \gamma_3 \end{pmatrix}, \beta = \begin{pmatrix} \beta_1 \\ \beta_2 \\ \beta_3 \end{pmatrix},$$

$$\ddot{\theta} = \begin{pmatrix} \ddot{\theta}_1 \\ \ddot{\theta}_2 \\ \ddot{\theta}_3 \end{pmatrix}, \dot{\theta}_{ii} = \begin{pmatrix} \dot{\theta}_1\dot{\theta}_1 \\ \dot{\theta}_2\dot{\theta}_2 \\ \dot{\theta}_3\dot{\theta}_3 \end{pmatrix}, \dot{\theta}_{ij} = \begin{pmatrix} \dot{\theta}_1\dot{\theta}_2 \\ \dot{\theta}_1\dot{\theta}_3 \\ \dot{\theta}_2\dot{\theta}_3 \end{pmatrix}.$$

Note the inputs to this model are the net generalized torques c and the states are the generalized coordinates 0 and their derivatives 6.

Linearized Dynamics

The EKF algorithm requires the linearization of the dynamics about state trajectory in discrete-time form. The method for developing this linearization is first to determine the continuous time linearization about a state trajectory $$\dot{x} = Fx + Bu$$

and then convert to the discrete time form required by the CDEKF algorithm, namely $$x(t_i) = \Phi(t_i, t_{i-1}) x(t_{i-1}) + \gamma(t_{i-1}) u(t_{i-1}) \tag{119}$$

$$z(t_i) = H(t_i) x(t_i). \tag{120}$$

This section develops this linearization. The starting point is to rearrange Eqn. 115 so we write the rigid body dynamics as $$\begin{pmatrix} \dot{\theta} \\ \ddot{\theta} \end{pmatrix} = \begin{pmatrix} \dot{\theta} \\ A^{-1}(\tau + \gamma - B\dot{\theta}_{ii} - C\dot{\theta}_{ij}) \end{pmatrix}. \tag{121}$$

Equation 121 has the same form as previous described, namely $$\dot{x}(t) = f[x(t), u(t)], \tag{122}$$

and $$x^T = (\theta, \dot{\theta}), \tag{123}$$

$$u^T = (T, g). \tag{124}$$

Note that the inputs are T, the motor torques, and g, the gravitational acceleration constant.

Linearized System Matrix

Taking the partial differential of Eqn. 121 with respect to the state vector gives the following block-form for the linearized system matrix F $$F = \begin{pmatrix} \frac{\partial \dot{\theta}}{\partial \theta} & \frac{\partial \dot{\theta}}{\partial \dot{\theta}} \\ \frac{\partial \ddot{\theta}}{\partial \theta} & \frac{\partial \ddot{\theta}}{\partial \dot{\theta}} \end{pmatrix} = \begin{pmatrix} 0 & I_3 \\ \frac{\partial \ddot{\theta}}{\partial \theta} & \frac{\partial \ddot{\theta}}{\partial \dot{\theta}} \end{pmatrix} \tag{125}$$

An expression for the sub-block $$\frac{\partial \ddot{\theta}}{\partial \theta}$$

can be found by differentiating Eqn. 121 with respect to the configuration variable $\theta_k$, k=1, 2, 3 gives $$\frac{\partial \ddot{\theta}}{\partial \theta_k} = \frac{\partial}{\partial \theta_k} [A^{-1}(-B\dot{\theta}_{ii} - C\dot{\theta}_{ij} + \tau + \gamma)], \tag{126}$$

$$= -A^{-1} \frac{\partial A}{\partial \theta_k} A^{-1}(-B\dot{\theta}_{ii} - C\dot{\theta}_{ij} + \tau + \gamma) +$$

$$A^{-1}\left(-\frac{\partial B}{\partial \theta_k}\dot{\theta}_{ii} - \frac{\partial C}{\partial \theta_k}\dot{\theta}_{ij} + \frac{\partial \tau}{\partial \theta_k} + \frac{\partial \gamma}{\partial \theta_k}\right),$$

where use has been made of the following relationship, $$\frac{\partial}{\partial \theta_k}(A^{-1}) = -A^{-1} \frac{\partial A}{\partial \theta_k} A^{-1}.$$

Differentiating A, element-by-element, with respect to $\theta_k$ gives, $$\frac{\partial a_{ij}}{\partial \theta_k} = \frac{\partial a_{ij}}{\partial \psi} \frac{\partial \psi}{\partial \theta_k} + \frac{d a_{ij}}{d \theta_k}, \tag{127}$$

$$= \sum_{l=1}^{4} \frac{\partial a_{ij}}{\partial \psi_l} \frac{\partial \psi_l}{\partial \theta_k} + \frac{d a_{ij}}{d \theta_k},$$

$$= \sum_{l=1}^{4} \frac{\partial a_{ij}}{\partial \psi_l} J_{l,lk} + \frac{d a_{ij}}{d \theta_k}.$$

In a similar manner we can now write the partial differential of the components of B, C, $\tau$ and $\gamma$, $$\frac{d b_{ij}}{d \theta_k} = \sum_{l=1}^{4} \frac{\partial b_{ij}}{\partial \psi_l} J_{l,lk} + \frac{\partial b_{ij}}{\partial \theta_k}, \tag{128}$$

$$\frac{d c_{ij}}{d \theta_k} = \sum_{l=1}^{4} \frac{\partial c_{ij}}{\partial \psi_l} J_{l,lk} + \frac{\partial c_{ij}}{\partial \theta_k}, \tag{129}$$

$$\frac{d\tau_i}{d\theta_k} = \sum_{l=1}^{4} \frac{\partial t_i}{\partial \psi_l} J_{l,lk} + \frac{\partial t_i}{\partial \theta_k}, \quad (130)$$

$$\frac{d\gamma_i}{d\theta_k} = \frac{\partial g_i}{\partial \theta_k}. \quad (131)$$

Since A, B and C do not vary with $\dot{\theta}_i$, the partial derivative of $\ddot{\theta}$ with respect to $\dot{\theta}$ is given by, $$\frac{\partial \ddot{\theta}}{\partial \dot{\theta}_k} = \frac{\partial}{\partial \dot{\theta}_k} [A^{-1}(-B\dot{\theta}_{ii} - C\dot{\theta}_{ij} + \tau + \gamma)], \quad (132)$$

$$= A^{-1} \left( -B \frac{\partial \dot{\theta}_{ii}}{\partial \dot{\theta}_k} - C \frac{\partial \dot{\theta}_{ij}}{\partial \dot{\theta}_k} \right).$$

The derivatives $$\frac{\partial \dot{\theta}_{ii}}{\partial \dot{\theta}_k}$$

and $$\frac{\partial \dot{\theta}_{ij}}{\partial \dot{\theta}_k}$$

follow trivially.

The discrete-time state transition matrix can be expressed as follows $$\Phi(t_i, t_{i-1}) = \exp(F(t_{i-1})\Delta t), \quad (133)$$

Linearized Distribution Matrix

The linearized input distribution matrix G is similarly given by $$G = \frac{\partial f}{\partial u} = \begin{pmatrix} \frac{\partial \dot{\theta}}{\partial T} & \frac{\partial \dot{\theta}}{\partial g} \\ \frac{\partial \ddot{\theta}}{\partial T} & \frac{\partial \ddot{\theta}}{\partial g} \end{pmatrix} = \begin{pmatrix} 0 & 0 \\ A^{-1}\frac{\partial \tau}{\partial T} & A^{-1}\frac{\partial \gamma}{\partial g} \end{pmatrix} \quad (134)$$

The derivatives $$\frac{\partial \tau}{\partial T}$$

and $$\frac{\partial \gamma}{\partial g}$$

are easily obtained from Eqns. 112 and 108.
The discrete-time inputs satisfy $$\Gamma u(t) = \int_{t_{i-1}}^{t_i} B(t)u(t)\,dt,$$

from which follows the approximation of $\Gamma$ by $$\Gamma = B\Delta t.$$

Note that the distribution matrix is not required for application of CDEKF.

Measurement Equations

The available measurements are motor positions and motor armature voltages and currents. We desire to relate these to state variables $x^T = (\theta, \dot{\theta})$. The relationship is governed by the previous constraint equation.

It is assumed there is no direct measurement of motor speeds, however motor speed can be obtained the equations governing the electrical dynamics of the DC drives as follows. In matrix form these electrical dynamics can be written $$\begin{pmatrix} L_{as} & 0 & 0 \\ 0 & L_{ac} & 0 \\ 0 & 0 & L_{ah} \end{pmatrix} \begin{pmatrix} di_{as}dt \\ di_{ac}dt \\ di_{ah}dt \end{pmatrix} + \begin{pmatrix} R_{as} & 0 & 0 \\ 0 & R_{ac} & 0 \\ 0 & 0 & R_{ah} \end{pmatrix} \begin{pmatrix} i_{as} \\ i_{ac} \\ i_{ah} \end{pmatrix} +$$

$$\begin{pmatrix} K_{vs}(i_{fs}) & 0 & 0 \\ 0 & K_{vc}(i_{fc}) & 0 \\ 0 & 0 & K_{vh}(i_{fh}) \end{pmatrix} \begin{pmatrix} d\theta_s dt \\ d\theta_c dt \\ d\theta_h dt \end{pmatrix} = \begin{pmatrix} V_{as} \\ V_{ac} \\ V_{ah} \end{pmatrix}$$

or $$L\frac{dI_a}{dt} + RI_a + K_v\frac{d\psi}{dt} = V_a.$$

This expression can be rearranged in terms of motor speeds to give $$\frac{d\psi}{dt} = K_v^{-1}\left(V_a - L\frac{dI_a}{dt} - RI_a\right) \quad (135)$$

Because the DC drives have significant inductance, the product $$L\frac{dI_a}{dt}$$

can be significant at times of high rate of change of current. The rate of change of armature current is not directly measured, but an estimate of it can be obtained by high pass filtering currents. Alternatively motor speeds could be estimated using the motor model within a Kalman filter structure.

The state variables $\dot{\theta}$ are related to $$\frac{d\psi}{dt}$$

by $$\dot{\theta} = J_{dr}K_v^{-1}\left(V_a - L\frac{dI_a}{dt} - RI_a\right) \quad (136)$$

where $J_{dr}$ is obtained as previously defined as:

$$J_{dr} = \begin{pmatrix} -\dfrac{1}{G_s} & 0 & 0 \\ 0 & \dfrac{\sin(\theta_2 - \theta_5)}{G_c \gamma_1} & \dfrac{1}{G_h \gamma_1} \\ 0 & -\dfrac{1}{G_c} & 0 \end{pmatrix},$$

with $$\gamma_1 = d_3 \cos(\theta_2 - \theta_5) - (l_2 + l_4)\sin(\theta_2 - \theta_5).$$

Measurement Noise Covariance

The measurement errors on motor positions, armature voltages, and armature currents can all be considered independent and will be assumed to be zero mean and Gaussian. This imposes a covariance structure on the effective measurements $y^T = (\theta, \dot{\theta})$ that is determined by Eqns. 135 and 136.

We begin by considering the covariance on errors in the derived motor speed measurements. The constituent terms are measurement errors in armature current, rate of current, and armature voltage. Let these be given by $$\Sigma_{Ia} = \begin{pmatrix} \sigma^2_{Ias} & 0 & 0 \\ 0 & \sigma^2_{Iac} & 0 \\ 0 & 0 & \sigma^2_{Iah} \end{pmatrix}$$

$$\Sigma_{\dot{I}a} = \begin{pmatrix} \sigma^2_{\dot{I}as} & 0 & 0 \\ 0 & \sigma^2_{\dot{I}ac} & 0 \\ 0 & 0 & \sigma^2_{\dot{I}ah} \end{pmatrix}$$

$$\Sigma_{Va} = \begin{pmatrix} \sigma^2_{Vas} & 0 & 0 \\ 0 & \sigma^2_{Vac} & 0 \\ 0 & 0 & \sigma^2_{Vah} \end{pmatrix}$$

It is well established that a sum of zero mean Gaussian distributed random variables is a zero mean Gaussian distributed variable with covariance equal to the sum of the covariances on the constituent parts. Hence the covariance of estimated motor speed will be $$\tau = K_v^{-1}(\Sigma_{Va} + L \Sigma_{\dot{I}a} L^T + R \Sigma_{Ia} R^T) K_v^{-T} \qquad (137)$$

Because the constituent matrices are all diagonal, $\Sigma$ is diagonal.

Assume measurement errors on motor positions are zero mean and Gaussian with covariance given by $$\Sigma_\psi = \begin{pmatrix} \sigma^2_{\psi s} & 0 & 0 \\ 0 & \sigma^2_{\psi c} & 0 \\ 0 & 0 & \sigma^2_{\psi h} \end{pmatrix}$$

The measurement error covariance on the derived state measurements y is hence $$R = \begin{pmatrix} J_{dr} & 0 \\ 0 & J_{dr} \end{pmatrix} \begin{pmatrix} \Sigma_\psi & 0 \\ 0 & \Sigma_\psi \end{pmatrix} \begin{pmatrix} J_{dr}^T & 0 \\ 0 & J_{dr}^T \end{pmatrix}$$

$$= \begin{pmatrix} J_{dr} \Sigma_\psi J_{dr}^T & 0 \\ 0 & J_{dr}^T \Sigma_\psi J_{dr}^T \end{pmatrix}$$

This matrix is not diagonal. The off-diagonal terms show a coupling between crowd and hoist. Note that because $J_{dr}$ is configuration dependent, R is configuration dependent.

Implementation Notes

Practical implementation requires the expansion of both the equations of motion and their linearization into a computable form. In an embodiment practical implementation is achieved using the MATLAB symbolic mathematics toolbox. The approach starts with the transformation matrices and constraint equation and expands them symbolically to form the terms in Eqns. 115 and 125. The resulting expressions are then written out as both MATLAB 'mfiles' and 'C-code' fragments. The MATLAB code can be used for offline development and debugging while the C-code fragments can be formatted from within MATLAB for insertion directly into the code-base of the real-time system implementation.

The expressions for individual element terms resulting from the symbolic expansions are long and cumbersome and contain repeated expressions, suggesting that a computationally more efficient implementation is possible than that produced directly from the symbolic expansion under MATLAB. While a significant computation load, this does not impinge on the capacity to perform the real-time calculations in modern computer systems, even when running at rates greater than 100 Hz and with a large filter bank (50 models).

The realtime implementation is written in entirely in the C-language and runs under the QNX realtime operating system. The hardware platform is based on the PC-104 format with a 1 GHz Pentium processor. The system is populated with data acquisition cards to acquire signals form the electrical drives as described above. The payload estimator is typically configured to run at a rate 100 Hz with a bank of 50 filters. With this configuration, the CPU is loaded to approximately half its capacity. This load includes data acquisition, data logging, and other necessary activities such as the running of algorithms to detect changes in shovel activity, e.g. the beginning and end of the 'swing-with-full-bucket' phase of the shovel cycle when the payload calculations are undertaken.

Both the MATLAB and C versions implement the MMAE algorithm detailed earlier. Matrix calculations lie at the heart of all Kalman filter implementations. The MATLAB implementation uses the matrix capabilities provided within the language. The C implementation uses the MESCHACH public domain matrix library. In both implementations integration of the equation of motion, as needed by the MMAE algorithm, are completed using a 4-th order, fixed step, Runge-Kutta, ODE integrator. A comparison with adaptive step solvers during early simulations found the additional complexity and computational cost associated with such solvers was not warranted. The conversion of the continuous dynamics to discrete form, viz Eqn. 133, is done using the matrix exponential functions provided by MATLAB or MESCHACH as appropriate.

Motors are modelled as torque sources whose output is determined by the field and armature currents according to a characteristic such as that shown previously. These characteristics are represented in software using lookup tables with linear interpolation between grid points. Data for the characteristics was generated experimentally by the shovel manufacturer.

Geometric dimensions, inertias, gear ratios, etc as needed have been supplied from the shovel manufacturer. Dimensional information and gear ratios were sourced from manufacturing drawings. Masses for individual components and inertias have been obtained from CAD models of machines.

Recursive Least Squares Payload Estimation Using Static Force and Moment Balance Observe that the static force and moment balance previously described can be rearranged in terms of the payload mass $m_p$ as follows $$\begin{pmatrix} g((c_{zp}+l_2)\cos\theta_2 + (c_{xp}+d_3)\sin\theta_2) \\ g\cos\theta_2 \end{pmatrix} m_p = \qquad (138)$$

$$\begin{pmatrix} [(G_h(l_2+l_4)\sin(\theta_5-\theta_2) + G_h d_3\cos(\theta_5-\theta_2))T_h - g(m_2 c_{x2} + m_3(c_{z2}+l_2))\cos\theta_2 - g(m_3(c_{x3}+d_3) - m_2 c_{z2})\sin\theta_2] - \\ m_3 g\cos\theta_2 + G_c T_c + G_h\sin(\theta_5-\theta_2)T_h \end{pmatrix}$$

summarized as $$a_k m_p = b_k$$

For n measurements Eqn. 138 provides 2 n equations that can be assembled as follows $$\begin{pmatrix} a_1 \\ a_2 \\ \vdots \\ a_n \end{pmatrix}^{m_p} = \begin{pmatrix} b_1 \\ b_2 \\ \vdots \\ b_n \end{pmatrix}$$

or $$a m_p = b$$

Equation. 138 has the least squares solution $$\hat{m}_p = (a^T a)^{-1} a^T b. \qquad (139)$$

which can be computed recursively via $$\hat{m}_{p,k} = \hat{m}_{p,k-1} + K_k(b_k - a_k \hat{m}_{p,k-1}) \qquad (140)$$

with $$K_k = P_k a_k$$

$$P_k = (a_k^T a_k)^{-1} \qquad (141)$$

and $\hat{m}_{p,k}$ providing a least squares estimate of $m_p$ based on k measurements. In Algorithm 78, Eqn. 140 is used as the basis for the recursive least squares algorithm for payload estimation based on static force and moment balances.

Algorithm 5: Payload estimation for static force and moment equations by recursive least squares
  Initialization: $\hat{m}_{p,0}=0$, $k=0$
  for duration of swing do
  wait (timer interrupt)
  read ($\psi_{F,k}$, $T_k$)
  Solve for $\theta_{F,k}$ from $\psi_{F,k}$ using Algorithm 3.3.1
  Compute payload estimate $\hat{m}_{p,k}$ using Eqn. 140, i.e.

$$P_k = (a_k^T a_k)^{-1},$$

$$K_k = P_k^{-1} a_k,$$

$$\hat{m}_{p,k} = m_{p,k-1} + K_k(b_k - a_k \hat{m}_{p,k-1})$$

$$k = k+1$$

A comparison of Static and Dynamic Payload Estimation

The methodology used in comparing Algorithms is as follows:

The parameters of the model summarized by Eqn. 115 for a P&H4100 shovel were established from data provided by P&H. This includes dimensions, masses, and inertias from the P&H solid geometry (CAD) models developed during design the machine and from which manufacturing drawings for the machine were generated. Properties of the electrical drives including resistances, inductances, torque and speed characteristics where similarly extracted from experimentally generated characterization data provided by P&H.

The parameter-populated dynamic model was augmented with proportional-plus-derivative (PD) loops, closed on each motor position. These loops were tuned to give over-damped responses to step inputs on each axis of motion for the configuration when the payload mass is zero.

Measurements were made for sixty-three swing motions of a P&H4100 electric mining shovel. Data for four operators was collected to capture a range of 'operator styles'. The measured variables are those listed in the table below and included motor positions. This data was collected at 60 Hz.

Six configurations of the shovel were randomly chosen from this data to serve as controls for comparing the two algorithms when the machine is stationary. Under these conditions the underlying equations of both algorithms are valid and both algorithms are expected to give accurate results.

The recorded swing motions and the static control positions were used as inputs to the motor position loops to generate a time-series of motor-torque data for each 'loaded swing' trajectory and the 'machine stationary' data. For each loaded swing a fictitious payload, drawn from a uniform distribution in the range 0-80,000 kg, was added to the dipper so that the generated torques included a component required to move dipper payload. The objective is, of course, to determine this payload.

The computed motor torques are treated as if they were measured inputs. The motor positions and velocities resulting from these applied torques are treated as measured outputs. Estimates of payload are made from this data using the above Algorithms.

Tables 1 to 5 below give the results of applying the MMAE and static payload estimation errors to the synthesized data. The filter bank for the MMAE estimator was based on 30 Kalman filters. The hypothesized payloads distributed uniformly and regularly spaced over the range 0-80,000 kg.

Table 1 shows the results of the control tests. As expected, both algorithms produce estimates accurate to fractions of a percent of dipper capacity. Each row of Table 1 corresponds to holding the command positions constant to the PD loops on the truth model, so that, apart from some initial motion as the shovel model settled to a steady state under the PD control loops, the computed torques are those required to hold the model at a constant position under gravitational loading. The MMAE algorithm shows lower bias, but the standard deviation across the six control configurations is similar for both methods. The errors resulting from the application of the static payload algorithm are due to initial motion as the model settles to a constant position. If the dynamics are allowed to settle before the algorithm is applied, the estimate is made with zero error. The errors arising from the application of Algorithm arise largely because of the more complicated estimation process which sees the estimate generated as a weighted sum of the computed distribution.

common for the operator to extract the dipper low in the face so that a net upward motion is needed to bring the dipper to truck dump height. In such circumstances, the static payload estimator is expected to overestimate payload.

The dynamic payload estimator achieves significantly better estimates of payload across all motion trajectories. The maximum error for the 63 trajectories is 229 kg, the average errors for each operator are all less than 100 kg, and the standard deviation on the estimates for each operator is less than 60 kg.

These main conclusion drawn here is that the inertial and velocity loads associated with motion during are sufficiently large that they need to be accounted for. The results further

TABLE 1

Performance comparison MMAE and static payload estimates for constant inputs.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 1 | 41109.65 | 18 | 41056.62 | −53.04 | −0.07 | 41133.42 | 23.76 | 0.03 |
| 2 | 14058.05 | 17.83 | 14084.44 | 26.4 | 0.03 | 14005.46 | −52.59 | −0.07 |
| 3 | 24690.69 | 19.3 | 24707.1 | 16.4 | 0.02 | 24609.21 | −81.49 | −0.1 |
| 4 | 42762.54 | 18.5 | 42751.89 | −10.64 | −0.01 | 42688.88 | −73.66 | −0.09 |
| 5 | 75810.42 | 19.13 | 75866.74 | 56.32 | 0.07 | 75730.55 | −79.87 | −0.1 |
| 6 | 13738.21 | 20.6 | 13692.9 | −45.31 | −0.06 | 13721.3 | −16.91 | −0.02 |
| | | | Average | −1.645 | | | Average | −46.7933 |
| | | | Std. dev. | 42.66397 | | | Std. Dev. | 42.2472 |

Tables 2 to 5 compare the results of both algorithms when applied to the data synthesized by the measured motions from the four different operators. The significant points in these tables are the large errors associated with the static payload estimates. The static payload algorithm is seen to systematically underestimate payload. The mean errors range from approximately 12,000 kg to 20,000 kg. The standard deviations on those estimate errors range from approximately 3600 kg to 8000 kg. These range variations suggest that the static payload algorithm is susceptible to operator style. Inspection of the dipper trajectories reveals that is the collected swing motions the dipper is typically lowered after breaking the face before the material is dumped. The bench conditions during the data collection period were such that the operator was required to move the bucket up the face to achieve reasonable fills. The dipper was then lowered to the appropriate level for dumping to the tray of a haul truck. This net downward motion accounts for the underestimated payload estimates. Under different bench conditions, in particular in fine, loose rilling, dig material, the dipper is often filled earlier, and it is suggest that a multiple model adaptive estimator incorporating the rigid body dynamics is able to account for these loads and accurately estimate payload. The MMAE estimator overcomes the need for ad hoc approaches and is expected to out-perform them.

The MMAE estimator is expected to do well in this comparative study because it encodes exact knowledge of the dynamics of the system. Recall that according to the methodology, the same models used to generate torques and measurements treated as if they were measured as is used to process these torques and measurement in the MMAE algorithm. Note that both algorithms performed well under static conditions, showing that under the conditions where underlying system equations are known, both approaches work. In a practical implementation, the MMAE estimator will have only approximate knowledge of the machine dynamics due unmodelled dynamics, parameter errors, and transmission losses.

TABLE 2

Performance comparison MMAE and static payload estimates for constant inputs for swings by Operator A.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 1 | 56178.47 | 14.82 | 56198.71 | 20.24 | 0.03 | 45741.73 | −10436.7 | −13.05 |
| 2 | 18113.35 | 17.85 | 18250.68 | 137.33 | 0.17 | 10985.72 | −7127.63 | −8.91 |
| 3 | 39581.29 | 15.33 | 39710.96 | 129.67 | 0.16 | 24381.55 | −15199.7 | −19 |
| 4 | 9975.89 | 13.37 | 10030 | 54.11 | 0.07 | −1156.42 | −11132.3 | −13.92 |
| 5 | 6711.63 | 15.05 | 6782.09 | 70.46 | 0.09 | −10645.1 | −17356.7 | −21.7 |
| 6 | 31170.38 | 15.88 | 31236.75 | 66.37 | 0.08 | 14756.78 | −16413.6 | −20.52 |
| 7 | 22178.41 | 17.27 | 22304.63 | 126.21 | 0.16 | 6364.41 | −15814 | −19.77 |
| | | | Average | 86.34143 | | | Average | −13354.4 |
| | | | Std. dev. | 44.95562 | | | Std. dev. | 3809.091 |

TABLE 3

Performance comparison MMAE and static payload estimates for constant inputs for swings by Operator B.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 8 | 29444.26 | 18.07 | 29548.19 | 103.93 | 0.13 | 19540.68 | −9903.58 | −12.38 |
| 9 | 78676.72 | 13.72 | 78712.46 | 35.74 | 0.04 | 60387.14 | −18289.6 | −22.86 |
| 10 | 42830.9 | 14.95 | 42892.69 | 61.79 | 0.08 | 29983.69 | −12847.2 | −16.06 |
| 11 | 61254.31 | 13.17 | 61298.49 | 44.18 | 0.06 | 38865.13 | −22389.2 | −27.99 |
| 12 | 51717.89 | 13.8 | 51806.38 | 88.49 | 0.11 | 35668.45 | −16049.4 | −20.06 |
| 13 | 61371.5 | 14.83 | 61503.33 | 131.83 | 0.16 | 40289.47 | −21082 | −26.35 |
| 14 | 62418.9 | 15.53 | 62500.7 | 81.8 | 0.1 | 44351.95 | −18067 | −22.58 |
| 15 | 65836.97 | 15.25 | 65933.67 | 96.7 | 0.12 | 42099.82 | −23737.2 | −29.67 |
| 16 | 12153.69 | 15.15 | 12203.87 | 50.18 | 0.06 | −4419.99 | −16573.7 | −20.72 |
| 17 | 50038.15 | 11.08 | 50041.19 | 3.04 | 0 | 37470.25 | −12567.9 | −15.71 |
| 18 | 25174.11 | 19.47 | 25265.62 | 91.51 | 0.11 | 7333.54 | −17840.6 | −22.3 |
| 19 | 27752.31 | 13.02 | 27747.51 | −4.8 | −0.01 | 12696.53 | −15055.8 | −18.82 |
| 20 | 73376.26 | 13.18 | 73461.55 | 85.29 | 0.11 | 52077.75 | −21298.5 | −26.62 |
| 21 | 41580.86 | 17.05 | 41621.29 | 40.43 | 0.05 | 23183.51 | −18397.4 | −23 |
|  |  |  | Average | 65.00786 |  | Average | −17435.6 |  |
|  |  |  | Std. dev. | 38.99654 |  | Std. dev. | 3966.105 |  |

TABLE 4

Performance comparison MMAE and static payload estimates for constant inputs for swings by Operator C.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 22 | 32093.26 | 13.33 | 32172.86 | 79.6 | 0.1 | 9799.14 | −22294.1 | −27.87 |
| 23 | 48541.52 | 15.73 | 48569.93 | 28.4 | 0.04 | 25054.54 | −23487 | −29.36 |
| 24 | 62833.95 | 9.75 | 63044.27 | 210.32 | 0.26 | 28215.5 | −34618.5 | −43.27 |
| 25 | 74523.76 | 13.63 | 74548.74 | 24.98 | 0.03 | 45171.5 | −29352.3 | −36.69 |
| 26 | 69594.41 | 13.63 | 69667.37 | 72.96 | 0.09 | 47424.97 | −22169.4 | −27.71 |
| 27 | 69323.4 | 13.13 | 69405.6 | 82.19 | 0.1 | 43049.91 | −26273.5 | −32.84 |
| 28 | 53961.61 | 12.25 | 54043.03 | 81.43 | 0.1 | 34332.75 | −19628.9 | −24.54 |
| 29 | 60673.24 | 13.05 | 60717.59 | 44.35 | 0.06 | 31857.58 | −28815.7 | −36.02 |
| 30 | 46551.71 | 15.7 | 46601.94 | 50.23 | 0.06 | 20901.25 | −25650.5 | −32.06 |
| 31 | 31138.65 | 13.85 | 31183.57 | 44.93 | 0.06 | 9117.96 | −22020.7 | −27.53 |
| 32 | 28450.58 | 13.87 | 28558.43 | 107.85 | 0.13 | 10079.75 | −18370.8 | −22.96 |
| 33 | 16018.56 | 12.85 | 16061.77 | 43.21 | 0.05 | −7296.37 | −23314.9 | −29.14 |
| 34 | 66154.36 | 13.2 | 66269.99 | 115.63 | 0.14 | 44984.01 | −21170.4 | −26.46 |
| 35 | 33272.5 | 13.45 | 33407.59 | 135.09 | 0.17 | 4753.15 | −28519.4 | −35.65 |
| 36 | 37081.21 | 14.53 | 37185.47 | 104.26 | 0.13 | 13530.89 | −23550.3 | −29.44 |
| 37 | 78334.91 | 13.77 | 78428.51 | 93.6 | 0.12 | 46680.9 | −31654 | −39.57 |
| 38 | 10115.05 | 14.33 | 10257.79 | 142.74 | 0.18 | −6758.72 | −16873.8 | −21.09 |
| 39 | 17009.8 | 14.75 | 17024.2 | 14.4 | 0.02 | −6409.95 | −23419.8 | −29.27 |
| 40 | 76677.14 | 17.28 | 76748.62 | 71.48 | 0.09 | 58582.81 | −18094.3 | −22.62 |
| 41 | 58998.38 | 13.47 | 59090.99 | 92.61 | 0.12 | 34444.32 | −24554.1 | −30.69 |
| 42 | 32723.17 | 14.9 | 32797.34 | 74.17 | 0.09 | 17699.28 | −15023.9 | −18.78 |
| 43 | 62409.13 | 14.62 | 62407.41 | −1.73 | 0 | 46070.52 | −16338.6 | −20.42 |
| 44 | 60631.73 | 13.6 | 60757.15 | 125.42 | 0.16 | 43974.49 | −16657.2 | −20.82 |
| 45 | 76547.75 | 13.73 | 76607.19 | 59.44 | 0.07 | 54947.58 | −21600.2 | −27 |
|  |  |  | Average | 79.065 |  | Average | −23060.5 |  |
|  |  |  | Std. dev. | 47.07695 |  | Std. dev. | 5045.305 |  |

TABLE 5

Performance comparison MMAE and static payload estimates for constant inputs for swings by Operator D.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 46 | 2246.16 | 18 | 2309.85 | 63.69 | 0.08 | 1908.93 | −337.23 | −0.42 |
| 47 | 25498.83 | 14.92 | 25538.71 | 39.88 | 0.05 | 20661.83 | −4837 | −6.05 |
| 48 | 60556.05 | 12.8 | 60588.2 | 32.15 | 0.04 | 53690.35 | −6865.7 | −8.58 |

TABLE 5-continued

Performance comparison MMAE and static payload estimates for constant inputs for swings by Operator D.

| Sw. No | True Payload (kg) | Swing time (s) | MMAE Payload (kg) | MMAE Payload Error (kg) | MMAE error as % of full scale | Static Payload (kg) | Static Payload Error (kg) | Static error as % of full scale |
|---|---|---|---|---|---|---|---|---|
| 49 | 19439.07 | 17.17 | 19492.26 | 53.19 | 0.07 | 5352.62 | −14086.5 | −17.61 |
| 50 | 47164.53 | 14.73 | 47079.99 | −84.53 | −0.11 | 32649.71 | −14514.8 | −18.14 |
| 51 | 3471.79 | 16.73 | 3480.58 | 8.79 | 0.01 | −2873.06 | −6344.85 | −7.93 |
| 52 | 76484.27 | 16.08 | 76502.62 | 18.35 | 0.02 | 66165.12 | −10319.2 | −12.9 |
| 53 | 25530.56 | 13.88 | 25523.24 | −7.33 | −0.01 | 4250.77 | −21279.8 | −26.6 |
| 54 | 4748.68 | 11.32 | 4857.76 | 109.08 | 0.14 | −15098.6 | −19847.3 | −24.81 |
| 55 | 35350.2 | 17.6 | 35330.6 | −19.6 | −0.02 | 23222.3 | −12127.9 | −15.16 |
| 56 | 73202.92 | 13.45 | 73120.45 | −82.46 | −0.1 | 53792.76 | −19410.2 | −24.26 |
| 57 | 45780.21 | 17.07 | 45679.72 | −100.48 | −0.13 | 22644.07 | −23136.1 | −28.92 |
| 58 | 9507.13 | 19.57 | 9560.29 | 53.16 | 0.07 | 175.14 | −9331.99 | −11.66 |
| 59 | 45582.45 | 16.22 | 45525.29 | −57.16 | −0.07 | 18845.73 | −26736.7 | −33.42 |
| 60 | 20164.19 | 17.27 | 20182.64 | 18.45 | 0.02 | 10072.07 | −10092.1 | −12.62 |
| 61 | 39669.18 | 16.73 | 39625.3 | −43.88 | −0.05 | 19270.39 | −20398.8 | −25.5 |
| 62 | 18938.57 | 15.9 | 18947.73 | 9.16 | 0.01 | −13376.4 | −32314.9 | −40.39 |
| 63 | 38157.9 | 18.1 | 38259.99 | 102.09 | 0.13 | 22706.19 | −15451.7 | −19.31 |
| | | | Average | 6.252778 | | Average | −14857.4 | |
| | | | Std. dev. | 61.57864 | | Std. dev. | 8267.319 | |

The foregoing describes preferred forms of the present invention. Modifications are obvious to those skilled in the art can be made thereto without departing from the scope of the invention.

The invention claimed is:

1. A method of payload estimation of weight bearing machinery, the method comprising the steps of:
    (a) creating a series of Kalman filter approximations to the weight bearing machinery, each approximation representing a system model of the weight bearing machinery having distinct levels of payload;
    (b) determining from said series an overall approximation of the current operating parameters of the weight bearing machinery; and,
    (c) utilizing the parameters derived from said step (b) to determine an estimated payload of said weight bearing machinery.

2. The method according to claim 1 wherein said weight bearing machinery comprises an electric mining shovel.

3. The method according to claim 1 wherein the inputs to one or more of the Kalman filters include weight bearing machinery drive control signals for controlling movement of the weight bearing machinery or cognate signals leading to direct or indirect measurement of hoist rope and crowd forces.

4. The method according to claim 1 wherein each Kalman filter approximation simulates increasing payloads on said weight bearing machinery.

5. The method according to claim 1 wherein said step (b) further comprises the steps of forming a current model probability for each system model and then forming a weighted sum of the models to determine the overall approximation of the current operating parameters of the weight bearing machinery.

6. The method according to claim 1 wherein said step (b) further comprises the steps of:
    identifying one of the system models which most closely approximates the current operating parameters; and
    setting the identified model as the overall approximation of the current operating parameters of the weight bearing machinery by assigning the identified model a probability larger than the probability assigned to the other system models.

7. A method of payload estimation of weight bearing machinery, the method including the steps of:
    (a) utilizing a plurality of adaptive predictive models for predicting a future state of a series of time varying parameters associated with a rigid body dynamic equation of the machinery;
    (b) determining for each model a difference measure between the projected future state and an actual measured state;
    (c) utilizing said difference measure to adaptively improve model coefficients of each respective said adaptive predictive model; and,
    (d) utilizing each said adaptive predictive model to produce said payload estimation.

8. The method according to claim 7 wherein each said adaptive predictive model is directly derived from a system model.

9. The method according to claim 7 wherein said model coefficients are improved such that variance of said difference measure is minimized in a mean squared sense.

10. The method according to claim 7 wherein each said adaptive predictive model is independent and has a distinct model.

11. The method according to claim 10 wherein said payload estimation is produced by a weighted sum of parameters predicted from each said adaptive predictive model.

12. The method according to claim 7 wherein each said adaptive predictive model is a Kalman filter and Kalman filter techniques are utilized to adaptively improve said model coefficients.

13. A method of payload estimation of weight bearing machinery, the method including the steps of:
    utilizing a multi-model approach to build up a statistical inferencing system directed to the operation of the machinery, and
    deriving therefrom a payload estimation, the method further including the steps of:
    (a) creating a plurality of system models, each model representing the weight bearing machinery having distinct levels of payload;

(b) determining from said plurality of models an overall approximation of the current operating parameters of the weight bearing machinery; and utilizing said overall approximation to produce said payload estimation.

14. The method according to claim 13 wherein the plurality of system models is approximated by a series of Kalman filters.

15. A system for payload estimation of weight bearing machinery, said system comprising:

one or more input sensors configured to measure input coefficients from said machinery; and a processor configured to receive said input coefficients from said input sensors; said processor further configured to:

evaluate a plurality of adaptive predictive models for predicting a future state of a series of time varying parameters associated with a rigid body dynamic equation of the machinery, determine for each model a difference measure between said future state and said measured input coefficients, utilize said difference measure to adaptively improve model coefficients of each said adaptive predictive model, and utilize each said adaptive predictive model to produce said payload estimation.

16. The system according to claim 15 wherein said processor is configured to simultaneously evaluate a plurality of adaptive predictive models for predicting said future state of said parameters.

17. The system according to claim 16 wherein each said adaptive predictive model is independent and has a distinct model.

18. The system according to claim 16 wherein said processor is configured to utilize each said adaptive predictive model by computing a weighted sum of parameters predicted from each said adaptive predictive model.

19. The system according to claim 15 wherein each said adaptive predictive model is a Kalman filter and said processor is configured to adaptively improve said filter coefficients using Kalman filter techniques.

* * * * *